(12) United States Patent  
Yeager

(10) Patent No.: US 8,151,345 B1  
(45) Date of Patent: Apr. 3, 2012

(54) SELF-AUTHORIZING DEVICES

(76) Inventor: C. Douglas Yeager, Knoxville, TN (US)

( * ) Notice: Subject to any disclaimer, the term of this patent is extended or adjusted under 35 U.S.C. 154(b) by 1058 days.

(21) Appl. No.: 12/019,318

(22) Filed: Jan. 24, 2008

Related U.S. Application Data

(60) Provisional application No. 60/897,110, filed on Jan. 25, 2007, provisional application No. 60/932,704, filed on Jun. 1, 2007.

(51) Int. Cl.  
*G06F 7/04* (2006.01)

(52) U.S. Cl. ............ 726/20; 726/9; 235/380; 235/375; 235/439; 235/492; 713/165; 710/313

(58) Field of Classification Search ............... 726/9, 20; 235/380, 375, 439, 492; 710/313; 713/165  
See application file for complete search history.

(56) References Cited

U.S. PATENT DOCUMENTS

| | | | |
|---|---|---|---|
| 6,439,464 B1 | 8/2002 | Fruhauf et al. | |
| 6,763,399 B2 * | 7/2004 | Margalit et al. | 710/13 |
| 6,883,715 B1 | 4/2005 | Fruhauf et al. | |
| 6,991,173 B2 | 1/2006 | Fruhauf | |
| 7,011,247 B2 * | 3/2006 | Drabczuk et al. | 235/451 |
| 7,150,397 B2 | 12/2006 | Morrow et al. | |
| 7,213,766 B2 * | 5/2007 | Ryan et al. | 235/492 |
| 7,249,266 B2 | 7/2007 | Margalit et al. | |
| 2006/0143326 A1 * | 6/2006 | Hauck | 710/18 |
| 2006/0255158 A1 | 11/2006 | Margalit et al. | |
| 2007/0208949 A1 * | 9/2007 | Lu et al. | 713/186 |
| 2007/0262138 A1 * | 11/2007 | Somers et al. | 235/380 |
| 2008/0128513 A1 * | 6/2008 | Hammad et al. | 235/492 |
| 2009/0039156 A1 * | 2/2009 | Brandli et al. | 235/382 |
| 2009/0187687 A1 * | 7/2009 | Hulbert et al. | 710/73 |

FOREIGN PATENT DOCUMENTS

EP 1843277 10/2007

* cited by examiner

*Primary Examiner* — Vivek Srivastava  
*Assistant Examiner* — Hee Song  
(74) *Attorney, Agent, or Firm* — Luedeka Neely Group, P.C.

(57) ABSTRACT

Self-authorizing cards and cellular network adapters for authorization of financially payments and other secure transactions. In some embodiments a smart card is provided with a connector for a USB port on a computer terminal such as a personal computer (PC). Embodiments are also provided for mobile phones, personal digital assistants (PDAs), and similar devices. The self-authorizing devices typically include a secure element that has been previously provisioned with information about a particular card holder account. A secure element reader interrogates the smart element and derives information needed to authorize the transaction. A communications controller transmits the information to a host device, such as a PC, PDA, or a mobile phone.

25 Claims, 19 Drawing Sheets

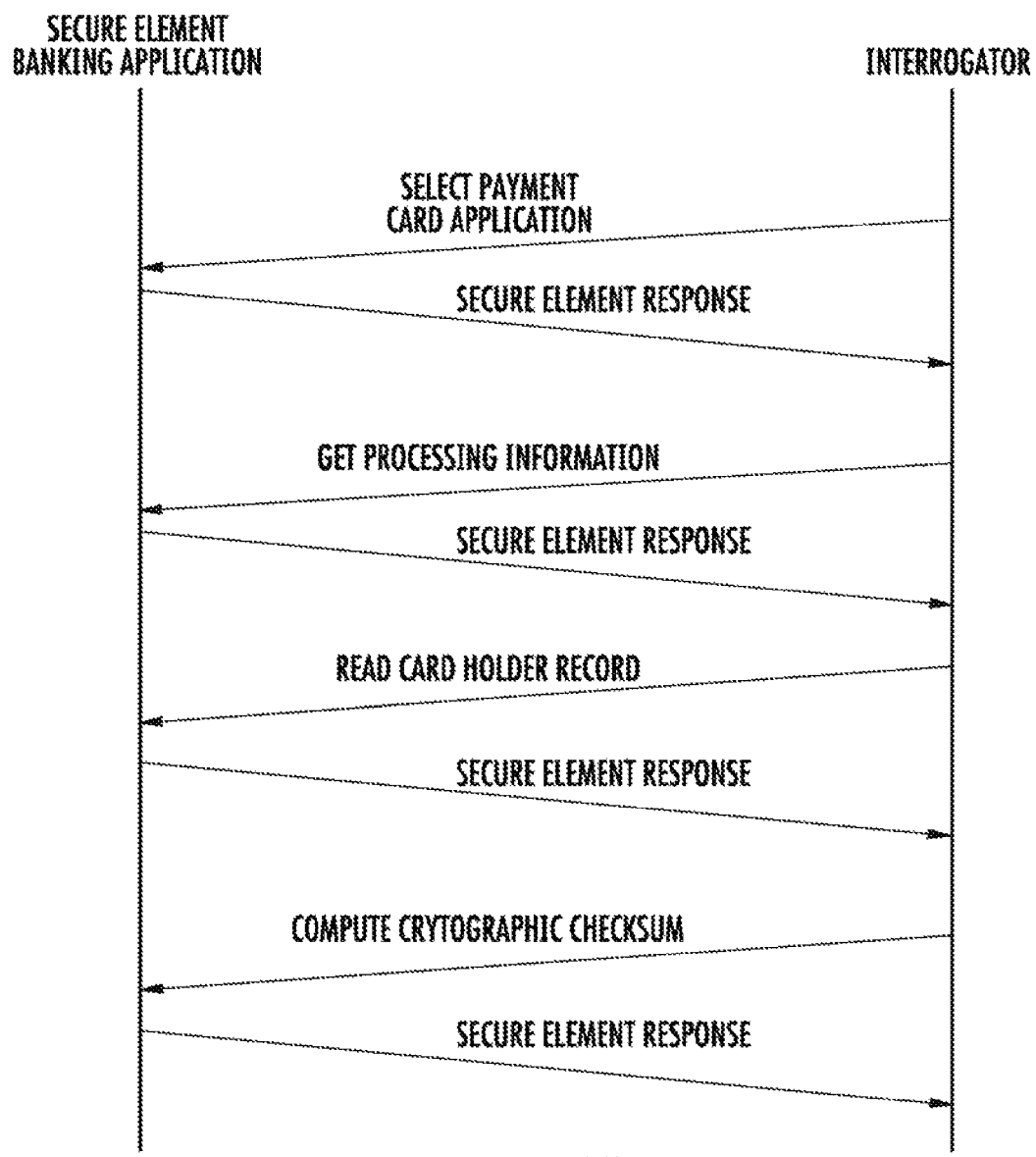
FIG. 5.1

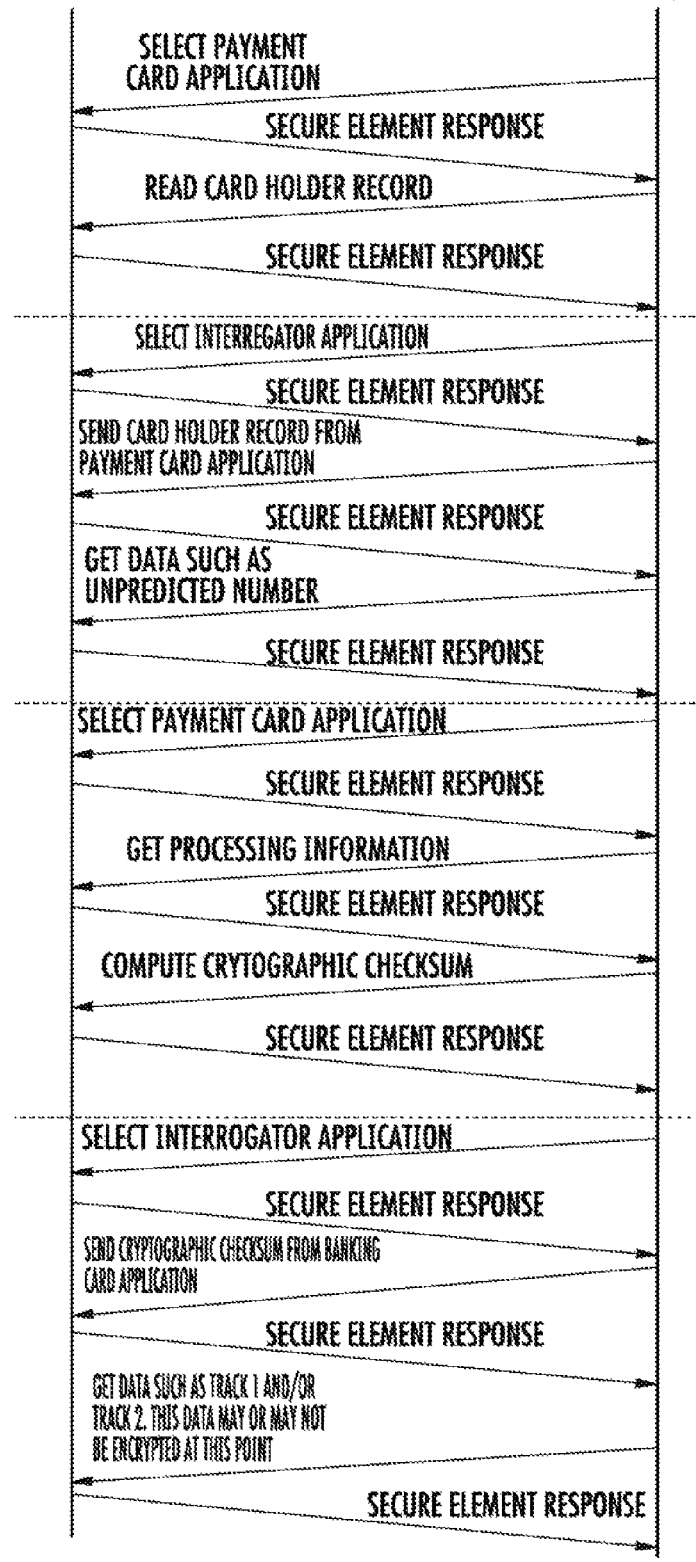
FIG. 5.2

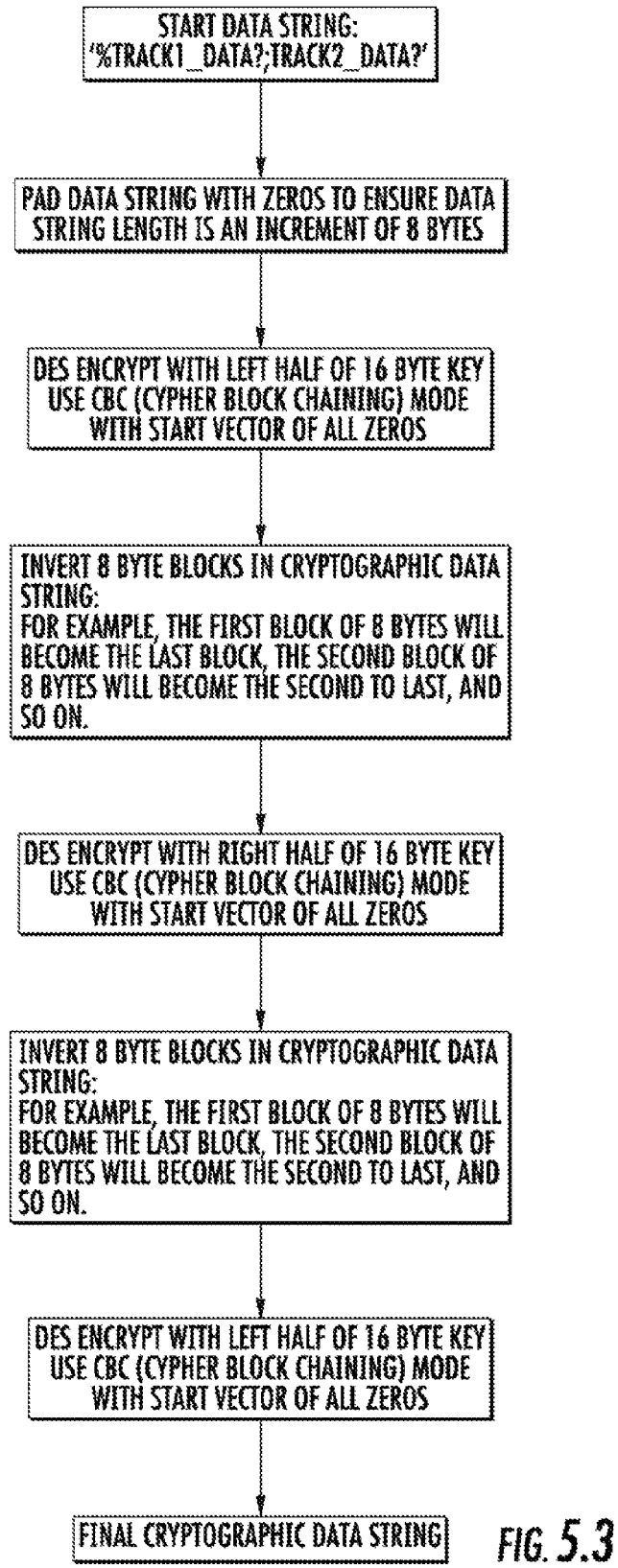
FIG. 5.3

CHECKOUT FORM

CART
WIDGET......................................$15.99
TAX: $0.00
SHIPPING: $3.00
TOTAL: $18.99

SHIP TO
FIRST: JOHN   LAST: SMITH
ADDRESS: 426 WILDCREST LN
CITY: KNOXVILLE   TENNESEE   ZIP: 37934

CARD INFORMATION
INSERT PAYMENT CARD IN USB PORT: 0F4B154C C5CED5817    — 100
(Wait a few seconds after inserting card, field will self populate)

SUBMIT

COPYRIGHT 2007 ELEMENTAL KNOWLEDGE LLC

*FIG. 6*

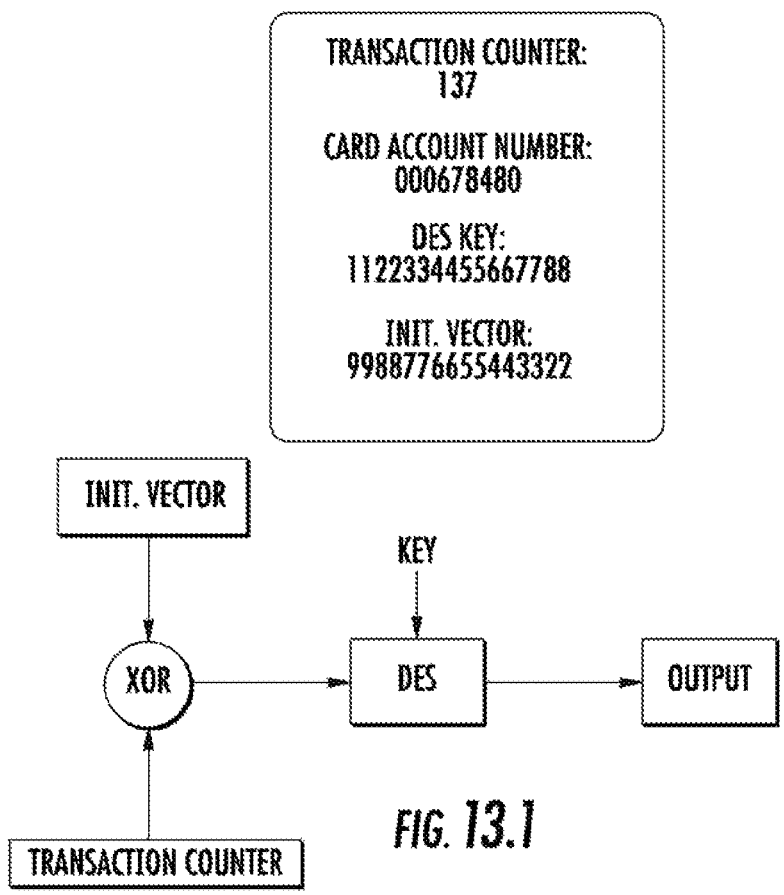
FIG. 13.1
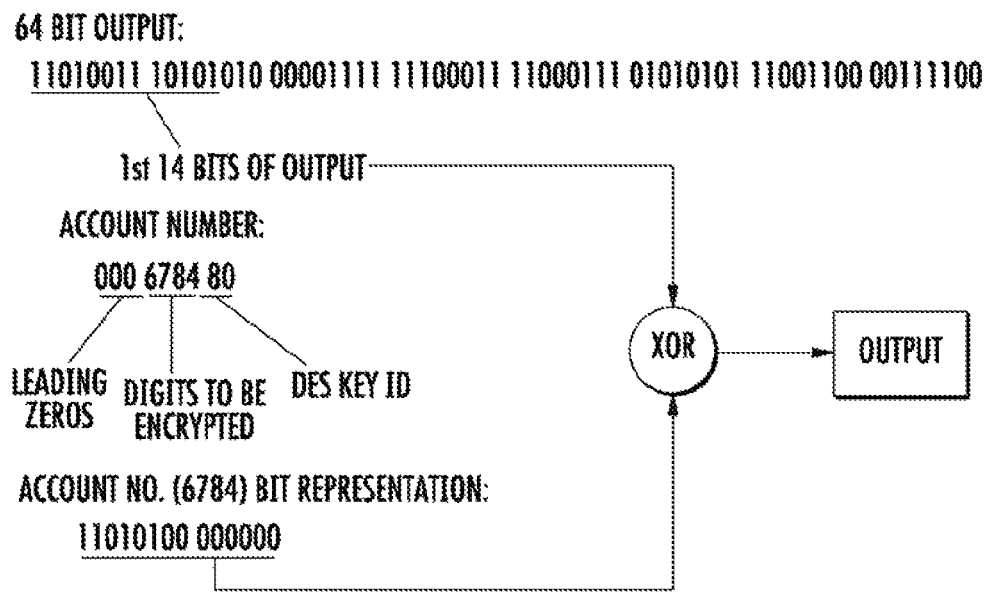
FIG. 13.2

14 BIT OUTPUT:
  00000111 101010
DECIMAL CONVERSION:
  0490
BUILD ENCRYPTED ACCOUNT NUMBER:
137 0490 80
TRANSACTION COUNTER — ENCRYPTED DIGITS — DES KEY ID
FIG. 13.3
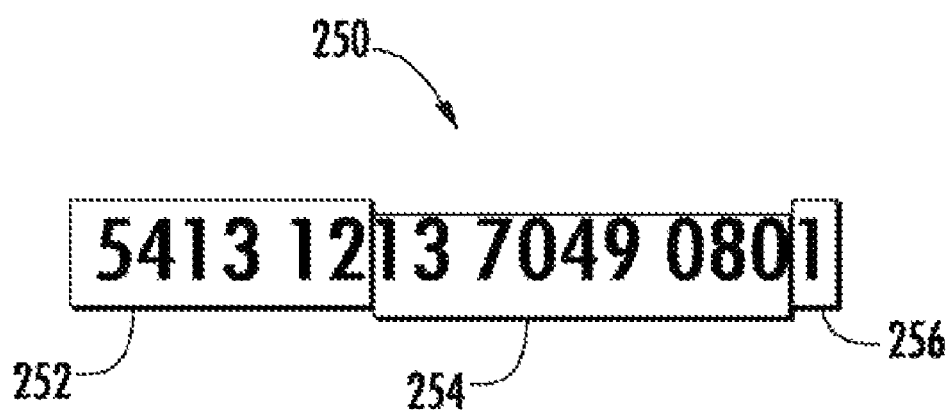
FIG. 13.4

CHECKOUT FORM

CART
WIDGET.................................. $15.99
TAX: $0.00
SHIPPING: $3.00
SHIPPING: $18.99

SHIP TO
FIRST: [      ] LAST: [      ]
ADDRESS: [            ]
CITY: [      ] SELECT STATE ▽ ZIP: [   ]

CARD INFORMATION
CARD NUMBER: [5413121014184801] — 300
EXP. DATE (mm/yyyy): [        ]
INSERT PAYMENT CARD IN USB PORT =>
*(Wait a few seconds after inserting card, field will self-populate)*

[ SUBMIT ]

*FIG. 15*

CHECKOUT FORM

CART
WIDGET........................ $15.99
TAX: $0.00
SHIPPING: $3.00
SHIPPING: $18.99

SHIP TO
FIRST: [    ]  LAST: [    ]
ADDRESS: [    ]
CITY: [    ]  SELECT STATE [▽]  ZIP: [    ]

CARD INFORMATION
CARD NUMBER: [5413122011762806] — 302
EXP. DATE (mm/yyyy): [    ]
INSERT PAYMENT CARD IN USB PORT=> [    ]
*(Wait a few seconds after inserting card; field will self-populate)*

[SUBMIT]

*FIG. 15.1*

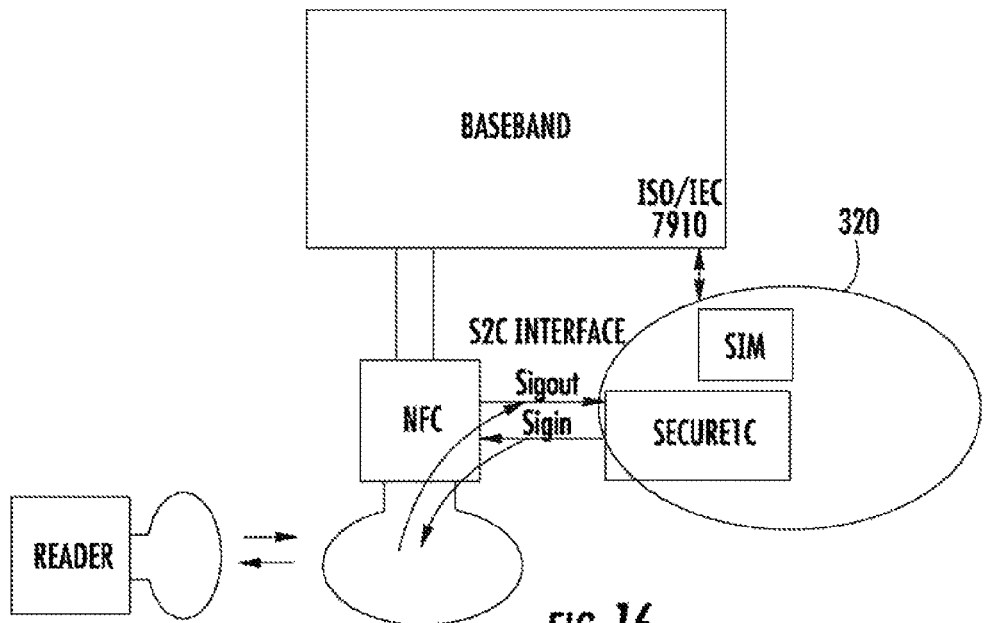
FIG. 16
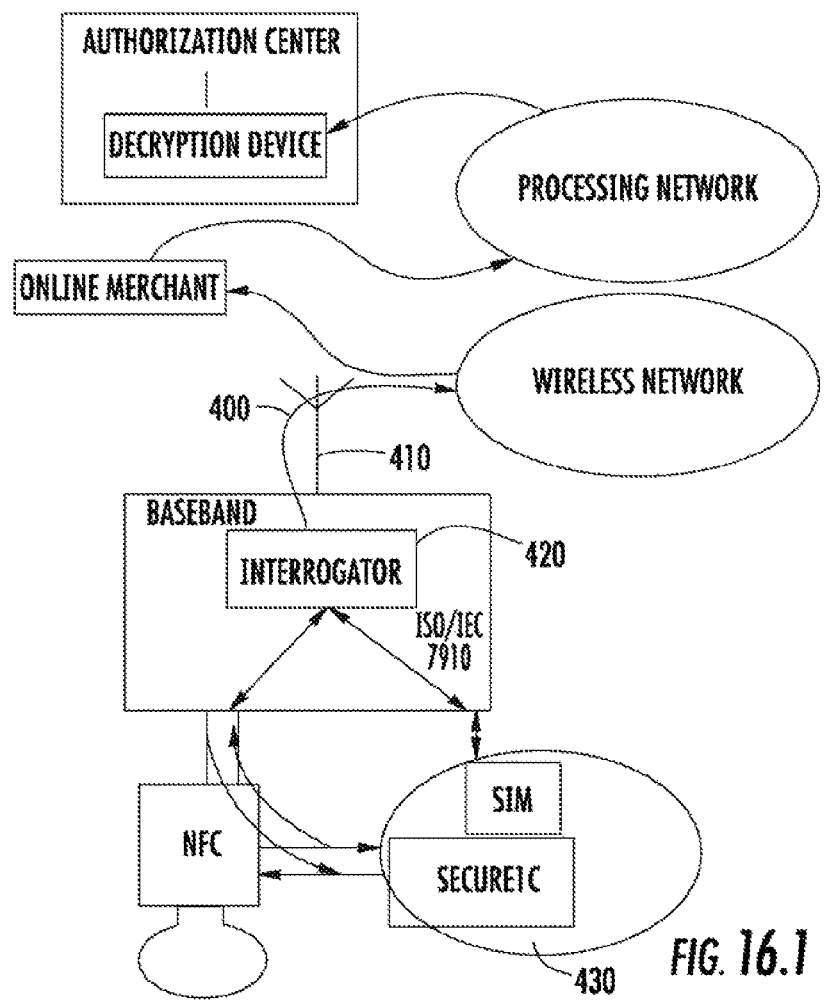
FIG. 16.1

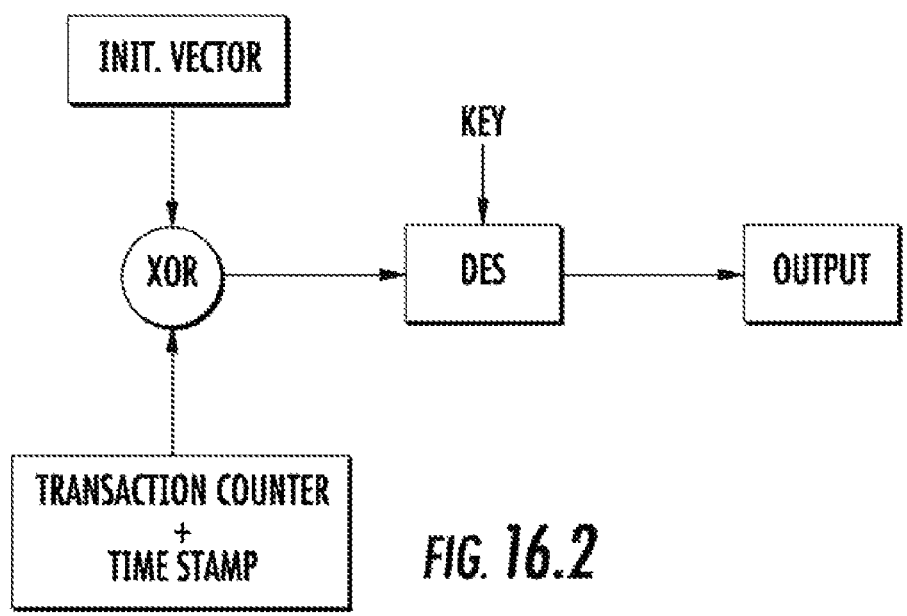
FIG. 16.2

US 8,151,345 B1

SELF-AUTHORIZING DEVICES

CROSS REFERENCES TO RELATED APPLICATIONS

This patent application claims priority from and is related to U.S. Provisional Patent Application Ser. No. 60/897,110 filed Jan. 25, 2007, entitled: Method and Apparatus for Self-swiping Smartcard Payments and this patent application claims priority from and is related to U.S. Provisional Patent Application Ser. No. 60/932,704 filed Jun. 1, 2007, entitled: Method and Apparatus for a Self-swiping Smartcard. Provisional Patent Application Ser. Nos. 60/897,110 and 60/932,704 are incorporated by reference in their entirety herein.

FIELD

This invention relates to the field of devices configured to authorize transactions using secure element microchips. More particularly, this invention relates to tokens or cellular network devices that contain secure element microchips and are configured to authorize financial transactions over the internet.

BACKGROUND

In some payment technologies such as smartcards, a microchip referred to as a "Secure Element" (SE) is embedded into the payment card, the payment fob, or another other device that may be used for making payments. In order to extract information from the SE, an interrogator, also referred to herein as a "reader", is required to interact electrically with the SE. The reader typically follows standards set forth by the International Organization for Standardization (ISO) or proprietary standards established by financial institutions or other application providers. In addition to making payments such devices may be used for other purposes such as controlling access to networks and databases and verifying identity. Such devices typically employ sophisticated technologies for enhancing the security of these transactions and preventing fraud. However, the use of the internet is becoming more popular for such purposes. What are needed therefore are devices and methods that adapt the enhanced security and fraud prevention techniques used in smartcard systems for use in internet-based transactions.

SUMMARY

The present disclosure provides, in one embodiment, a self-authorizing smart token that includes a mounting structure having an integral communication connector configured to connect to a computer terminal. This embodiment also includes a secure element that is affixed to the mounting structure and the secure element has a data file. There is also a secure element reader that is affixed to the mounting structure and configured to interrogate the secure element by executing file system functions according to ISO 7816-4 and to generate file information from the secure element data file. The self-authorizing smart token also has a communications controller that is affixed to the mounting structure and that is configured to receive the file information from the secure element reader and that is configured to convert at least a portion of the file information into transaction information and to transmit the transaction information to the computer terminal through the communications connector.

Another embodiment provides a self-authorizing smart token that has a mounting structure that includes an integral Universal Serial Bus (USB) connector configured to connect to a computer terminal. There is also a secure element that is affixed to the mounting structure and the secure element has a data file. This embodiment also includes a communications controller that is affixed to the mounting structure and that is configured as a Human Interface Device (HID) class USB-device and that is configured to extract information from the secure element data file and that is configured to convert at least a portion of the data file into transaction information and to transmit the transaction information to the computer terminal through the USB connector.

In another embodiment, a self-authorizing smart token has a mounting structure that has an integral communication connector that is configured to connect to a computer terminal. There is a secure element that is affixed to the mounting structure, and the secure element comprising a data file comprising financial authorization data. There is a communications controller that is affixed to the mounting structure and configured to extract at least a portion of the financial authorization data from the secure element data file and configured to encrypt the at least a portion of the financial data and to transmit the encrypted financial authorization data as transaction information to the computer terminal using the communication connector.

A further embodiment provides a self-authorizing cellular network adapter for a cellular network device configured with a cellular network application interface. The self-authorizing cellular network adapter includes a secure element that has a data file. There is a secure element reader that is configured to interrogate the secure element by executing file system functions according to ISO 7816-4 and to generate file information from the secure element data file. Further, there is a communications controller that is configured to receive the file information from the secure element reader and to convert at least a portion of the file information into transaction authorization information and to transmit the transaction authorization information to the cellular network device through the cellular network application interface.

BRIEF DESCRIPTION OF THE DRAWINGS

Various advantages are apparent by reference to the detailed description in conjunction with the figures, wherein elements are not to scale so as to more clearly show the details, wherein like reference numbers indicate like elements throughout the several views, and wherein:

FIGS. 5.1 and 5.2 illustrate interaction and data exchange between an interrogator chip and an SE.

FIG. 5.3 illustrates a method of encrypting data.

FIG. 6 illustrates one embodiment of an online web form with an auto-populating field for a self-swiping card.

FIGS. 13.1-13.4 illustrate elements of an encryption algorithm.

FIGS. 15 and 15.1 illustrate an embodiment of an online web form with an auto-populating field.

FIGS. 16 and 16.1 illustrate a mobile phone embodiment.

FIG. 16.2 illustrates and encryption technique.

DETAILED DESCRIPTION

Figure 1:
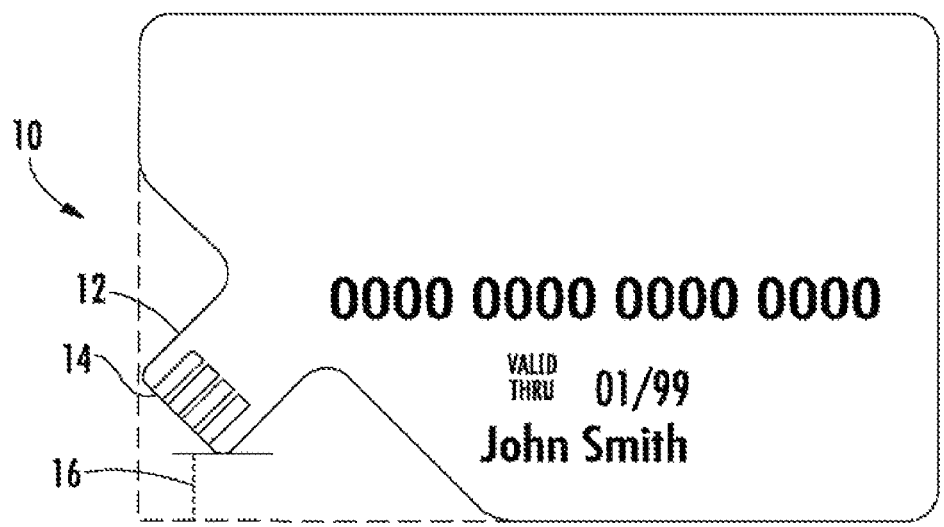
FIG. 1 is a drawing of one embodiment of a self-swiping card with a USB interface.

In the following detailed description of the preferred embodiments, reference is made to the accompanying drawings, which form a part hereof, and within which are shown by way of illustration the practice of specific embodiments of self-authorizing smart tokens and embodiments of self-authorizing cellular network adapters. It is to be understood that other embodiments may be utilized, and that structural changes may be made and processes may vary in other embodiments.

For the purpose of simplifying language and providing a convenient example, the device that houses a secure element (SE) microchip is typically referred to herein as a "card" or "card device." It is important to note that the "card" or "card device" may not physically resemble the shape or size of a typical payment card and may come in various alternate form factors such as fobs, cartridges, or dongles, or form factors that resemble removable digital memory media such as secure digital (SD) chips. The term "token" is used to encompass all of these form factors and the term "smart token" refers to a token that includes an SE. Each token has a mounting structure such as substrate (for card devices) or a packaging case (for fobs, cartridges, and dongles or SD chips).

In many embodiments described herein a card is configured to interact with a computer terminal. As used herein a computer terminal refers to a personal computer or a special-purpose terminal provided at a point of sale or public kiosk. For the purpose of simplifying language and providing a convenient example the term "PC" (referring to a personal computer) will be used as an example of a computer terminal. Typically the PC has access to an internet. As used herein the term internet includes the world-wide web as well as any other public or proprietary network that may be used for authorizing transactions.

In addition to applications involving computer terminals, embodiments are provided for mobile phones and personal digital assistants (PDAs) that communicate over a cellular network. Such mobile phones and PDAs are referred to herein as cellular network devices. The term "cellular network adapter" is used herein to describe a system that includes in a secure element (SE) microchip for use in a cellular network device. Of particular interest are cellular network devices that are configured for authorization of financial transactions over a network. Typically the cellular network device includes a web browser that is configured for authorization of a financial transaction over the world-wide-web. However in some embodiments the browser may connect to a different public network or to a proprietary network. In some embodiments the cellular network device may connect to a dialup voice network and the cellular network device may be configured for authorization of a financial transaction over the voice network, such as by transmission of DTMF tones or by other encoding.

As previously indicated, in order to extract information from an SE, an interrogator or "reader" is used to interact electrically with the SE. Because readers are not typically part of most PCs, it is very beneficial to place the reader functionality on the card device and translate information from the SE into a data stream format such as a USB (Universal Serial Bus) that PCs are generally capable of processing. Other convenient translated formats include software application output, text messaging (e.g., short message service (SMS)), and email messaging. It is particularly advantageous to configure the card devices for HID (Human Interface Device) keyboard emulation for inputting a form field or fields on an application running on the PC. It is also very beneficial to place the reader functionality in the cellular network adapter and translate information into a data stream that may be sent over the cellular network by the cellular network device.

As used herein the term "host device" is used to refer to either (a) the computer terminal that receives the information from a card device or (b) the cellular network device that receives the information from the cellular network adapter.

A significant advantage of extracting and delivering the data within a card device or cellular network adapter is the ability to know beyond reasonable doubt that the data string being delivered over the internet indeed came from a particular SE. This knowledge creates a more secure transaction with lower risk to the merchant, card issuing bank, and card associations.

Heretofore the most secure methods for assuring the validity of an electronic transaction has involved extracting information from a banking card by of swiping the magnetic stripe through a magnetic stripe reader, or extracting the information from a smartcard with a separate contact or contactless reader connected to a point of sale terminal (POS). These methods are known as "card-present transactions." Because of their enhanced level of confidence in validity these methods allow a merchant to receive a discounted transaction fee for that particular transaction. An example of a less secure transaction is reading or entering account numbers, expiration dates, and card verification codes from a card in a phone call or with on-line internet ordering. These transactions are known as "card not present transactions" and incur a full transaction fee.

Preferred embodiments provided herein provide for incorporating a reader on a card device or within a cellular network adapter to extract and deliver banking track data that were generally not previously possible because of the inability to extract information from the SE or from a magnetic stripe at a computer terminal without a reader or to extract information from an SE in a cellular network adapter without a reader. Such embodiments add value in a mobile commerce or e-commerce environment by enabling more secure transactions over a voice network or an internet.

To prevent fraud, electronic transaction systems typically attempt to verify one or more of the following characteristics of a requestor:

1) Something the requestor knows (a password, answer to a question, etc.)
2) Something the requestor has (a physical token, such may be confirmed by embodiments herein)

3) Something the requestor is (such as a physical trait established by a fingerprint or other biometric identifier)

"2-factor authentication" is defined as an authentication where the requestor (the entity to be authenticated) successfully provides two of the above three different types of verifications. If two of these verifications have been provided the authentication is considered "strong." One important advantage of many embodiments described herein is the ability to confirm that a card is present and authentic. This by itself provides a basis for 2-factor authentication over a public or private network using currently ubiquitous access hardware such as a computer terminal or a cellular network device.

Described herein are configurations of a "Reader On Card" (ROC) or "self-swiping" card, or "self-authorizing" card. The terms "ROC," "self-swiping" and "self-authorizing" are synonymous and refer a configuration wherein the card device or cellular network adapter contains both an SE and SE reader functionality. Configurations for a dynamic or encrypted PAN (Personal Account Number) are also described. This refers to configurations where the "Reader On Card" further encrypts the track data in order to securely transport the data packet over a public network. Neither of these concepts is limited to one particular form factor or embodiment. Some examples of devices that may employ these elements include a USB device or a token or a mobile phone that is enabled with contactless (13.56 MHz radio frequency) or NFC (Near Field Communication) RFID technology.

An SE typically contains a microprocessor, random access memory (RAM) that stores a data file, read-only memory (ROM), flash memory (EEPROM), encryption engine(s), and one or more methods of interfacing the SE. Executable applications such as the MasterCard, PayPass, VISA, Contactless, and AMEX Express Pay may be compiled and placed on an SE. Personalization information that is unique to the specific card holder is generally also placed on an SE. The applications for an SE are typically specified by application providers such as MasterCard, VISA, or AMEX among others. The applications may be created using any number of software development tools and then compiled to run on any number of SE architectures.

The applications running on the SE are typically provisioned with card holder specific information prior to being delivered to the card holder. The provisioning entities such as First Data Corp. must follow strict guidelines set forth by card associations such as VISA, MasterCard, AMEX, and others that keep the provisioning process secure and ensure that customer data is protected inside the SE and that only the card issuing banks or their agents are able to verify the information that is extracted from the SE. It is important that this process is not disrupted and abided by while including the advantages of the present invention.

In order to extract information from the application(s) on an SE, an interrogator, also referred to as a "reader", is required to interact electrically with an SE. The interrogator software may be provided in many different forms such as a software module or a pre-programmed microchip. The hardware that the interrogator runs on may also come in different forms such as an ARM processor, or a small M8 processor. The hardware that encompasses a SE and or an interrogator may be referred to as a chip or die. A die is the raw silicon that is packaged during the chip manufacturing process.

The applications on an SE are accessed by a reader with specific query/response calls defined by the application provider as mentioned above. These applications are generally designed to protect the data on a SE via encryption engines in the SE. The protocols used by a reader to pass data to and from a SE are typically defined in the ISO 7816 or ISO 14443 specifications. These protocols are referred to as query/response protocols. An interrogator sends a query and a SE sends a response.

In many embodiments the physical interface between a reader and an SE conforms to standards defined in the ISO 7816 and ISO 14443 specifications. The ISO 7816 specification defines a "Contact" interface to a SE in which the SE is powered by DC voltage and ground electrical connections from an interrogator. The data transfer during the interrogation is managed by an interrogator providing a clock signal connection and data line connection to an SE. The ISO 14433 specification defines a "Contactless" interface to an SE in which the SE is powered by an inductive field produced by an interrogator during the interrogation. The data transfer during the interrogation is managed over a 13.56 MHz carrier signal provided by an interrogator. The physical interface that the interrogator uses to connect to the SE may also be provided in different forms such as UART, or an NXP proprietary S2C interface. It is also possible that the interrogator shares the same silicon chip as the SE and the interface between them is provided by internal memory or physical traces in the silicon.

The "Universal Serial Bus" USB interface is a standard interface to laptop computers and personal computers or other form of computer terminal as a means of expanding the capabilities of the computer terminal or transferring information between the computer terminal and another device. More information about the USB interface may be obtained at www.usb.org.

The "Human Interface Device" HID interface is a class of USB interface which is a universal standard for a USB host to connect to USB client device. Within the HID class, there are several defined types of devices, including a "keyboard" type. By the USB device interfacing the USB host with the "keyboard" type of HID class interface, the standards require that the USB host recognize the device as a standard device (e.g., a keyboard) and accept input as such without requiring that the computer have any special drivers or operating system updates installed. By configuring a card device as an HID keyboard the card device emulates a keyboard attached to the computer terminal. The computer terminal will recognize and accept the card device as a keyboard input device. This is a very useful feature in many applications for enabling a more user friendly "self-swiping" functionality in the card device.

Included in most embodiments is a "communications controller." The communications controller provides the interface for data exchange between the reader and a communications connector (in the case of a card device) or the interface for data exchange between the interrogator and a cellular network application interface (in the case of a cellular network adapter). The communications connector may be provided in different forms such as USB, USB connection with HID class keyboard type or USB connection with mass storage class, among many others. The interface may be established using other hardware interface standards as well such as SDIO, mini-SD. In many card device embodiments the communications connector is an integral part of the card device, meaning that the communications connector is formed on an edge portion of the card. The cellular network application interface may, for example, be provided as a baseband input/output port for a web browser running on the cellular network device. The physical connection may be provided by a communication bus or by micro-circuitry in common processor and memory areas in the baseband portion of the cellular network device.

In either card device embodiments or in cellular network adapter embodiments, the communications controller may be physically incorporated into the reader or may be physically incorporated into the secure element or the communications controller may be a physically separate electronic element. In some embodiments the capabilities defined herein for the communications controller may physically be performed in the chip that is primarily the SE and/or the interrogator, or the capabilities of the interrogator may physically be performed in the chip that is primarily the SE and/or the communications controller, or the capabilities of the SE may be physically performed in the chip that is primarily the communications controller and/or the interrogator, or the capabilities of the interrogator and the SE and the communications controller may all be performed in a single chip. In any case, the capabilities of the communications controller, the SE and the interrogator are still considered to be performed by the "communications controller," the "SE" and the "interrogator" respectfully. Furthermore, in some embodiments the PDA or phone processor may be connected directly to the SE. In such embodiments the phone processor interrogates the SE to achieve valid transaction data from the SE. The PDA or phone processor may deliver this data to a form field or directly over the cellular network. In such embodiments the communications controller and the interrogator of the SE are now a portion of the PDA or phone processor itself instead of either of communications controller or the interrogator being a separate hardware chip.

In some embodiments of a self-swiping "Reader On Card" (ROC) device the interrogator and SE are integrated together on the same medium, device or circuit. It is important to note that in contactless implementations the interrogator portion of the ROC device may not be able to function from power harvested from the contactless inductive antenna, and therefore may require power from an external source, such as the communication connector to the computer terminal (in the case of a card device) or the cellular network device battery (in the case of a cellular network adapter).

The data that are automatically delivered to the host device may represent bank account information in the form of "Track 1" and/or "Track 2" data. Track 1 and Track 2 data are commonly-used representations of bank account information that is specific to a card holder. These data generally have a very specific industry standard format in order to be properly processed through transaction processing systems. The Track 1 data format was developed by International Air Transportation Association (IATA). The Track 2 data format was developed by the American Banker Association (ABA). In some embodiments the Track 1 data that are generated as file information from the SE data file and converted into transaction information by the communication controller and transmitted to the host device may comprise only a portion of the Track 1 data content specified in a standard published by the IATA. In some embodiments the transaction information may be the entire Track 1 data content specified in an IATA standard. In some embodiments the Track 2 data that are generated as file information from the SE data file and converted into transaction information by the communication controller and transmitted to the host device may comprise only a portion of the Track 2 data content specified in a standard published by the ABA. In some embodiments the transaction information may be the entire Track 2 data content specified in an ABA standard. However, it is important to note that in some embodiments the transaction data delivered to the host device may not be standard Track 1 or Track 2 data. It is possible that this data may be in another standard or proprietary format. In any case, the transaction data may or may not be an encrypted cipher text in whole or part upon delivery to the host device.

Typically a card device transaction authorization process begins when a user is instructed by a web browser-based application program on a computer terminal to insert a self-authorizing smartcard into a USB port on a computer terminal. When the smartcard is inserted, if the self-authorizing smart card is a USB HID keyboard class card device, the smartcard typically self-initializes with the operating system of the PC and begins to automatically input the relative card data into the appropriate field in the browser form. Many embodiments automate the input of card information such as PAN, expiration date, and security code. The USB HID keyboard class card device may use access keys or "hot keys" to navigate the form that has the current focus for input in the computing device. The card device may also automatically remove any information that may have been inadvertently typed prior to card device insertion. The card device may also automatically "submit" the online form using access keys or "hot keys".

An example where the HID keyboard device of the card automatically inputs a sequence of key presses of the device using "hot keys" is as follows.

a. [alt]+',' (This makes the cursor take focus on form element that has a designated access key of ','—the comma key)
b. [ctrl]+'a' (This makes the cursor select all the text that is existing in the current field of focus)
c. [Backspace] (This makes the cursor erase all the currently selected text)
d. [alt]+'.' (This makes the cursor take focus on the form element that has a designed access key of '.'—the period key . . . this could be set to a "submit" button for example)

A benefit of many embodiments is delivery of the information on the SE to the form that has the current focus for input in the host device. A self-authorizing smart token or a self-authorizing cellular network adapter the may deliver this information in a manner of emulating keystrokes from a keyboard device to the host device. For security reasons the application program that has the current focus on the host device (and is collecting this input) may take precaution inside its programming logic to require that the keystrokes being input into a particular form field are keystrokes and not simply a "paste" keystroke from an electronic "clipboard." Alternately, the application program may require that the keystrokes being input into the form field are fast keystrokes resembling the pattern that only an automated keystroke emulation input device could provide, and not a slower pattern of input that would resemble a manual input of keystrokes. Knowing these requirements, the communications controller element of the card device or the cellular network adapter may be programmed to provide the transaction information to the host device in a prescribed cadence for an application running on the host device.

For security reasons the form that has the current focus on the host device and is collecting this input may take precaution inside the programming logic that various pattern of "hot key" presses ([alt]+'some key') may be used to identify the input device as a secure input device. It is important to note the "hot key" keystrokes cannot be duplicated with the traditional "copy", "cut", or "paste" to the clipboard that some operating environments provide. However, such hot key keystrokes may be provided by various embodiments of communication controllers in self-authorizing devices defined herein.

Many embodiments deliver Track 1 and/or Track 2 data to a merchant from the SE of a payment card using the USB interface of a remote customer's PC in a simple, customer friendly manner. The consumer typically only has to insert the card device into a USB port on his/her computing device and the keystroke data will automatically input into the form that has the current focus on the computing device via keyboard emulation from the card device.

Many embodiments deliver Track 1 and/or Track 2 data that contain a dynamic card verification number from the SE of a payment card device, using the USB interface on a PC of a remote customer.

Many embodiments deliver Track 1 and/or Track 2 data that contain an incrementing transaction counter from the SE of a payment card device, using the USB interface on a PC of a remote customer.

Many embodiments use a "unique number" that is stored in the SE and delivered from the card device as further access control security that must be provided to in order to protected content such as recorded music, recorded video, live media, photos, documents and other similar media. An example of this is that the data file of sensitive or licensed content may be encrypted with a key or a diversified key based on the key within the SE. This would allow only the card holder of the SE to successfully "unlock" and view or listen to the protected content.

Many embodiments use a transaction counter that is stored and updated in the SE to uniquely identify a card holder as well as uniquely identify each given transaction or "swipe" from the card device. Remote transaction approval software may check that the Track 1 and Track 2 data from an SE is what is expected for the current transaction, and may update the transaction counter for the next transaction.

In many embodiments the card device is configured to resemble the physical form factor of typical payment cards as closely as possible with the exception of adding a region of the card that is meant to be inserted into the USB port of a computing device. This facilitates carrying the card device in an ordinary wallet or purse.

In many embodiments the smart token is configured to resemble the physical form factor of a "fob" that may be placed on a consumer key ring.

In many embodiments the card device is configured to limit the height of the USB connector so that the device is thin enough to still be carried in an ordinary wallet or purse.

In many embodiments the self-authorizing smart token or the self-authorizing cellular network adapter is designed to minimize part count and assembly costs so that it can be manufactured at a very low price for high volume, low cost uses.

Referring now to FIG. 1, the face and back of the self-swiping card medium 10 are shown. The dimensions of this embodiment are roughly 2⅛×3⅛ inches, with a preferred maximum thickness of 0.09 in. The nominal thickness of the card is a maximum of 1/32 in. Looking at the left side of the figure, there is a diagonal protrusion 12 that contains the connector 14 for a USB connection of a mating PC. The four contacts visible in the figure are the power, ground, D+, and D− signals that are defined in the USB specification at www.usb.org. The diagonal of the USB connector protrusion 12 is approximately 45 degrees and allows the protrusion approximately ⅝ in. clearance for insertion into a USB connector on a PC. The boundary of the card has been adjusted from its typical rectangular shape to account for this connection area. The diagonal protrusion has a clearance gap 16 between itself and the lower boundary of the card as seen in the figure. This gap 16 is for the purpose of allowing clearance of the "thicker" USB connection protrusion into some forms of "insertion" type magnetic stripe card readers. The face of the card also shows the PAN (portrayed as 0000 0000 0000 0000), expiration date, and card holder name in similar location to a typical rectangular banking card. The back of the card includes a magnetic stripe 18 that is disposed in a location similar to that of a typical rectangular banking card.

Figure 2:
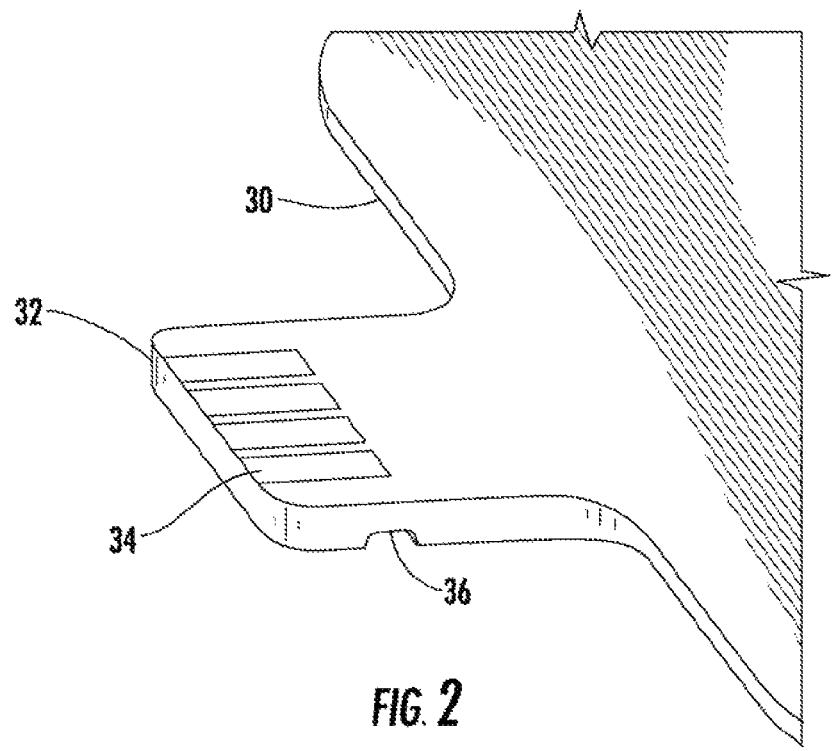
FIG. 2 is a drawing of a close up view of the USB interface connector on one embodiment of a self-swiping card.

Referring to FIG. 2, the close view of the USB connection protrusion of the self-swiping card medium as shown. Note the change in this thickness of the card from region 30, where the card is approximately 1/32 inch thick to zone 32 where the maximum thickness of the protrusion is approximately 0.09 in. where the USB contracts 34 are located. The protrusion of the male USB connection is approximately 15/32 in. wide in order to fit into the standard USB female connection on a PC as defined at www.usb.org. Approximately 3/16 in. in back of the leading edge of the protrusion there is a notch 36 that changes the thickness of the protrusion. This thickness change is for accommodating the "snap fit" of the USB female connector on the PC as defined at www.usb.org. The clearance between the leading edge of the protrusion and the bulk of the card medium is approximately ⅝ in. The style of this particular type of USB connection is not a standard mail USB connection. It has been altered to be much thinner than the typical male connection. As a result, it is susceptible to "upside down" insertion into the female USB connection.

Figure 3:
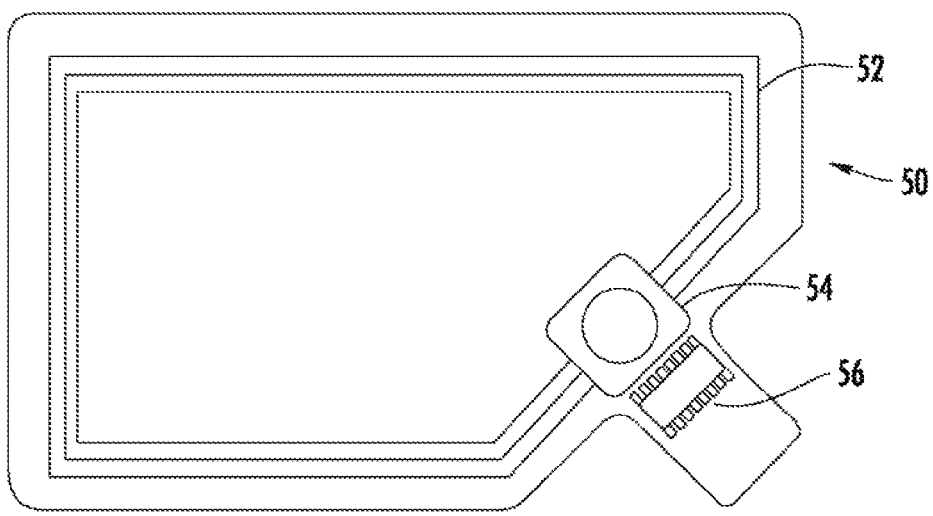
FIG. 3 is a drawing of the internals of one embodiment of a self-swiping card.

Referring to FIG. 3, the profile of a self-swiping card 50 with inside components exposed is shown. An antenna 52 is a printed or wire wound antenna that creates an inductive coil that provides power and transmits data to and from a secure element 54. The number of turns in the antenna 52 is dependant on the properties of the SE as well as the size of surface area the perimeter of the antenna covers. The antenna 52 is embedded inside the card medium and may or may not be congruent with the card medium perimeter. In some embodiments it may be desirable to shrink the area of the antenna 52 for manufacturing reasons such as card embossing. The secure element 54 shown in FIG. 3 is a microchip die that is wire bound to the module face plate through manufacturing methods. The secure element microchip die is typically then coated with epoxy for protection. In the embodiment of FIG. 3 the secure element 54 is a dual interface device that is accessible through the contactless antenna interface or through the contact 7816 style interface. When not plugged into the USB connection on a PC, the antenna serves as the sole power supply, data transmitter, and data receiver for the SE 54. When plugged into the USB connection on a PC, the antenna 52 is not intended to be used as a power supply or to transmit or receive data. Instead a combined interrogator/communications controller reads information from the SE 54 and transmits information to the PC through a USB connector on the protrusion of self-swiping card 50.

The protocols that define the communication to the SE are defined in ISO 14443 (contactless) and ISO 7816 (contact). The commands to communicate to the applications that are running on the SE are typically designed to interrogate the secure element and execute file system functions according to ISO 7816-4 in order to generate file information from SE data file. However, in some embodiments the commands to communicate to the applications that are running on the SE are provide by the application providers. In any case, the commands are generally the same regardless of the interface method (contact or contactless).

The SE is generally a secure microchip that has built in encryption engines, RAM, micro-processor, EEPROM, and communication interfaces. The interrogator and the communication controller (USB interface) chip shown in FIG. 3 is a chip that contains a microprocessor, RAM, EEPROM, and built in USB interface engine. The chip is programmed to describe itself to the host PC as a HID class "keyboard"

device upon connection to the PC. The chip then communicates to the SE via ISO 7816 (contact) interface protocols to acquire and build Track 1 and Track 2 data. After track data are acquired from a successful "read" of the SE, the data is then delivered to the PC's USB bus through the communications connector protrusion shown in the FIG. 3. It is important to note that it is possible for both the SE and the interrogator/USB interface chip die to be mounted and wire bound together on the same module medium. It is also important to note that these two chips could also be contained in one piece of silicon sharing the same RAM and/or EEPROM memory space.

Figure 4:
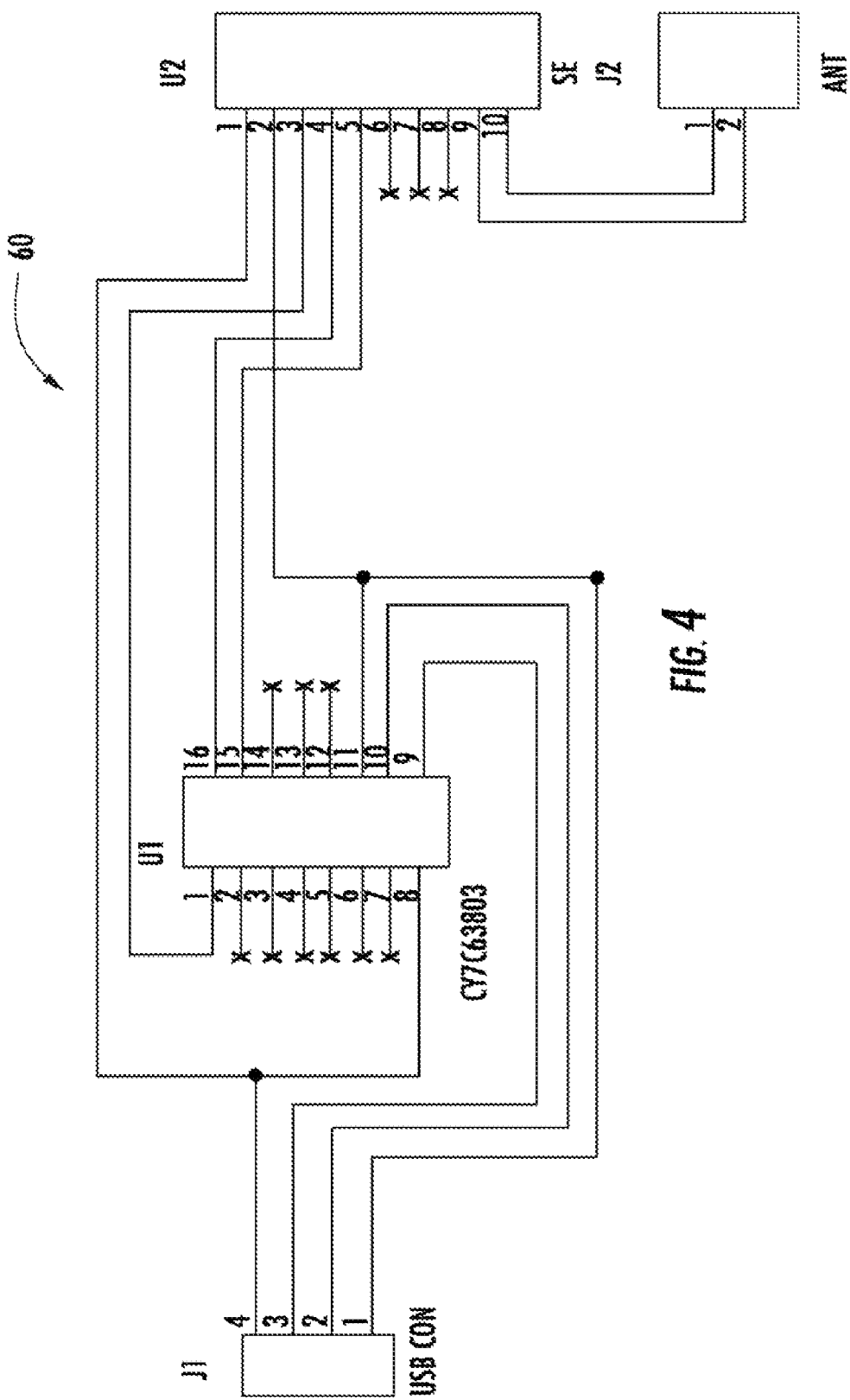
FIG. 4 illustrates a circuit board schematic according to one embodiment.

FIG. 4 illustrates a circuit board schematic 60 according to one embodiment. This shows a more detailed layout of the components described in FIG. 3 as well as the supporting components of typical embodiments. In this particular embodiment, the interrogator/USB bridge chip/die is a chip made by cypress semiconductor with a part number of CY7C3. The SE used in this particular embodiment is a chip/die with a standard ISO 7816 contact type interface in combination with a standard ISO 14443 contactless interface.

Figure 5:
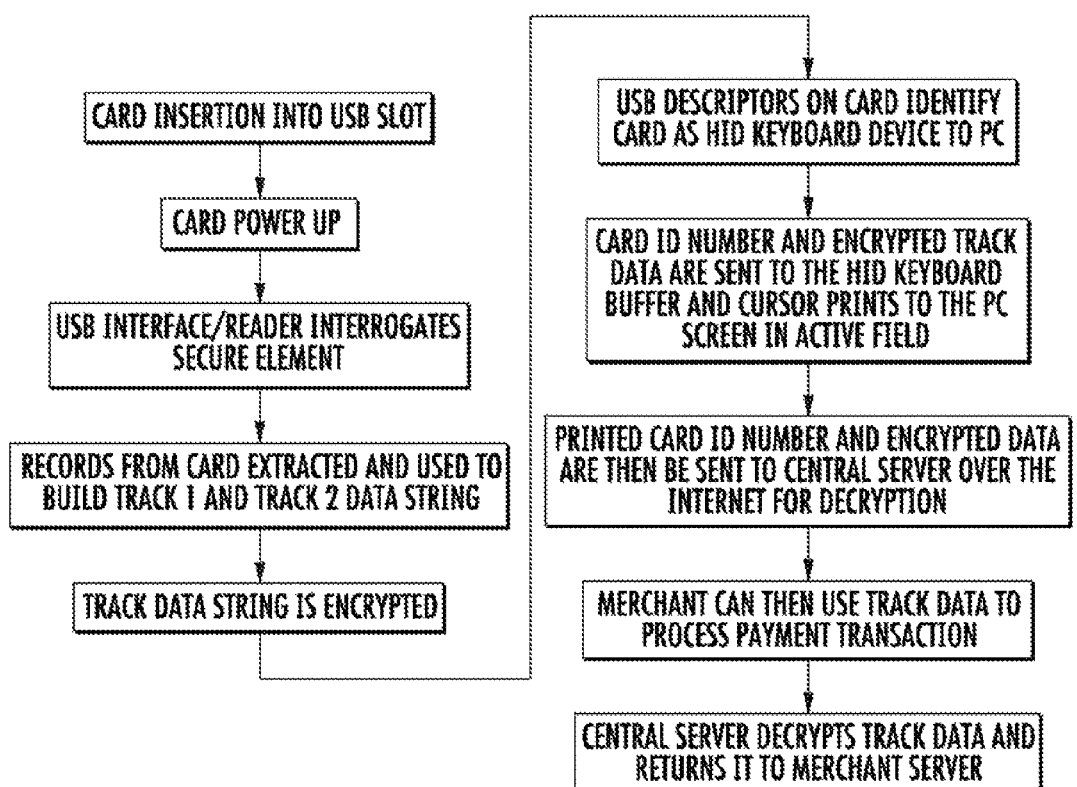
FIG. 5 illustrates a system where a self-swiping card is used to deliver track 1 and track 2 data to a merchant remotely via the internet.

FIG. 5 illustrates a flow diagram that describes one method embodiment. After the card device is plugged into the USB connector on the customer computing device, the card device powers up and begins to interrogate the SE on the card device. The interaction and data exchange between the interrogator chip and the on the SE could look something like the diagram in FIG. 5.1. In preferred embodiments the interrogation process conforms to application level protocols (APIs) established by ISO 7816-4. ISO 7816-4 defines two such application-level protocols:

(a) File system API providing a set of functions to manipulate files (e.g. read, write, select etc.)
(b) Security service API allowing the smart card and the reader to mutually authenticate themselves and also to encrypt data to be exchanged between the card and the reader.

In preferred embodiments the interrogation process conforms to protocol message structures also defined in 7816-4 to support the APIs. This message structure consists of application protocol data units (APDUs) which are exchanged between the reader application and the smart card application by the link level protocol. There are two types of messages used to support the ISO 7816-4 application protocols: the command Application Protocol Data Units APDU (sent from the reader to the card) and the response APDU (sent from the card to the reader).

After the interrogator has received the all the data from the interrogation of the banking application on the SE, the interrogator can then build the data string that is to be sent to the computing device as keystrokes. It is important to know that the SE can run multiple applications from different application providers. It is possible, and is one embodiment of this invention, for the interrogator to deliver the information that was acquired during interrogation of the banking application on the SE to a second application that resides on the same SE so that the second application can process, build, and possibly encrypt the data that will be delivered to the computing device as keystrokes.

An example of this embodiment that contains the interrogation of two applications on the SE may look something like the diagram in FIG. 5.2. The dotted lines in the figure represent the times during the entire interrogation of the SE that the interrogator selects different applications to use. The interrogator or the interrogator application on the SE may or may not encrypt the final Track 1 and/or Track 2 data.

FIG. 5.3 shows one embodiment of a method of encrypting this data. After the interrogator has acquired or built the data to be sent to the computing device as keystrokes, the USB interface enumeration begins. During the enumeration process, the card device, which is the client device, exchanges information with the USB host device. The information exchange is defined in the USB specifications and can be obtained at www.usb.org. As part of the exchange, the card device will send "descriptors" that tell the host device about the drivers that are required to run the client card device. The descriptors that the card device sends to the host include a HID (Human Interface Device) descriptor. The card device sends another descriptor that further defines the type of HID device to be a "keyboard" type of device. The USB host will now recognize the card device as a keyboard and expect that the card device will deliver "key codes" that represent keystrokes as input data. After enumeration has occurred and the host USB device recognizes the card device as a keyboard, the card device begins to deliver data to the current form that has the focus on the computing device. The data that are delivered may consist of:

a. Identification of the entity to which the data must be passed to for further processing.
b. Identification number of the particular card device that is delivering the data.
c. Identification number of the cryptographic key to be used for decrypting the data that is delivered from the card device.

The application, such as an internet browser, that is running on the computing device that has collected this information is then responsible for passing the information to the entity identified by the data above for processing. One embodiment of this invention involves passing this information in an online setting by one internet server passing this information string to another internet server. In this embodiment, the entity that controls the internet server that receives this information can then process the information along with the identity of the owner of the requesting internet server as they see fit. The entity that received the data can then return resultant data back to the requesting party. Also, in this embodiment, the information that is passed back to the requesting party is Track 1 and/or Track 2 data that is used to process typical card payment transactions by merchants.

Referring to FIG. 6 the internet browser form that receives the information from the card device as shown. This form represents one example of how a card device may be used. In this example an application running on a PC includes one specific field 100 on a form that is designated as the field that the card device will automatically populate when the card device is plugged into the PC that is displaying this form. In this example, the application has been programmed so that the form field 100 can be addressed using an access key or "hotkey" of ',' (the comma key). That is, when the card device issues this "hot key" keystroke (by use of keyboard emulation), the cursor will automatically move its focus to the field 100. The HTML (hypertext markup language) code that is used to create the self populating field may have this syntax:

<input type="text" name="data" size=""access key=","/>

The card device then populates the form field 100 with data. Then the auto-populating field 100 may be further checked by the application program for the authenticity of the keystrokes by the internet browser using "Java-Script" code that may be embedded into the HTML code. Also, the internet browser may check that each key was actually typed into the field by keystrokes rather than the use of "copy", "cut", and "paste" commands that may be provided some operating environments. The internet browser may also check that each keystroke was typed very fast resembling an automated input rather than a slower manner that would resemble manual input. The internet browser may check other aspects of the input data for its validity as it sees fit.

Figure 7:
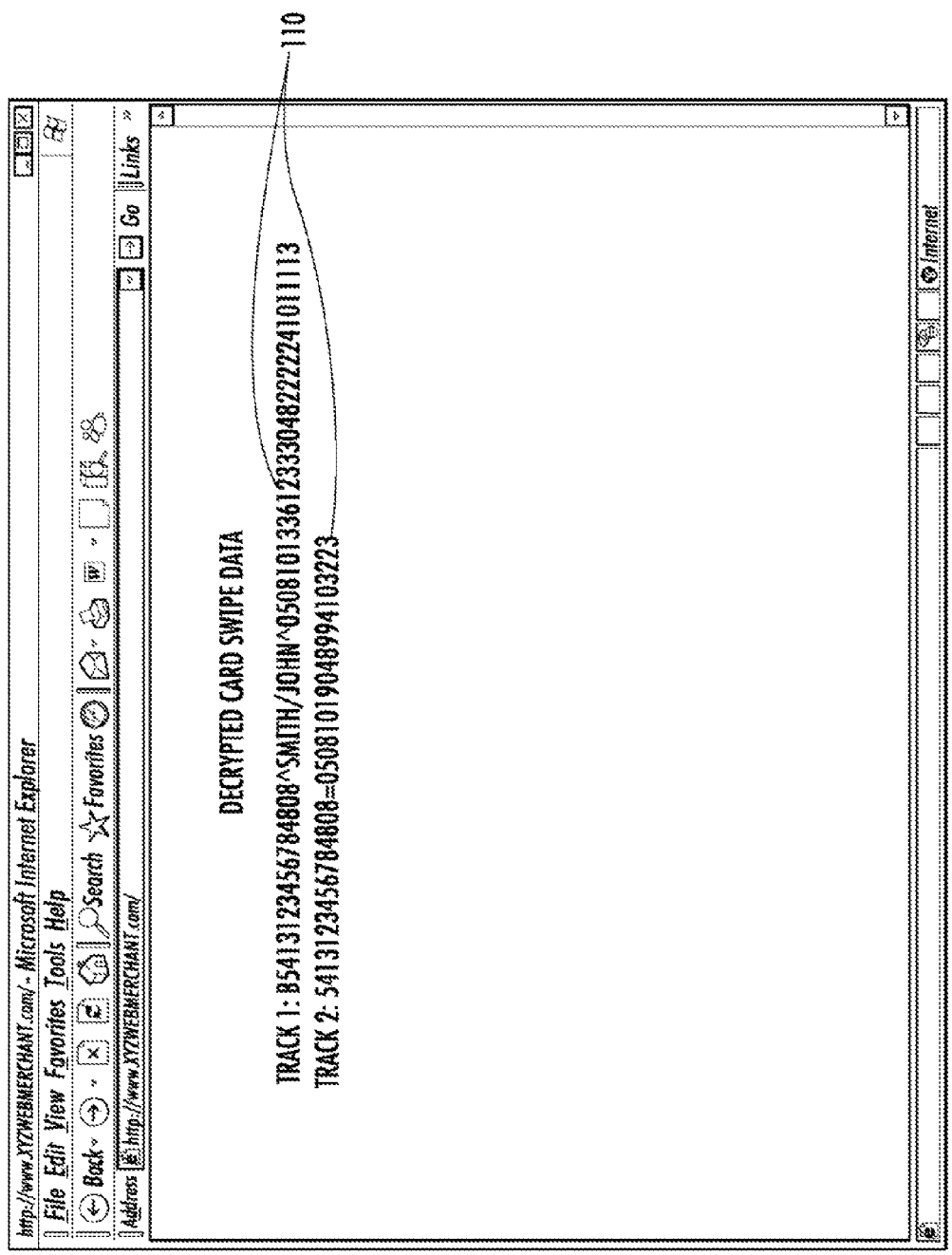
FIG. 7 illustrates the decrypted track data that was encoded within the information that came from the auto-populating field from FIG. 6.

Referring to FIG. 7, an internet browser screen displays decrypted data 110 that may be provided to a merchant transaction authorization system. The track information shown here is acquired using a Reader On Card (ROC) system. After the card reader extracts information from the SE and builds the track data containing the DVCC from the SE on the card, the track data are then delivered to the appropriate field in the transaction requester's browser as encrypted data via a USB HID keyboard interface. The information that is auto-populated on the requester's screen is not the Track data that is depicted in FIG. 7 because the ROC system encrypts the track data on the card device before the field on the requestor's browser is populated and the encrypted data are transmitted. The data on FIG. 7 is a decryption of the data that appears on the requester's screen. If the process is repeated by the requester the DVCC data and the transaction counter will change, in accordance with specifications for secure transaction encryption. In a typical application a merchant that is processing the information would not expose the clear text track information portrayed on the browser screen of FIG. 7. This figure is merely showing it as an example of the decrypted data. It should also be noted that in many embodiments the SE on the requester's card device may be used to make contactless transactions at in-store POS terminals by holding the card device up to a contactless reader.

Figure 8:
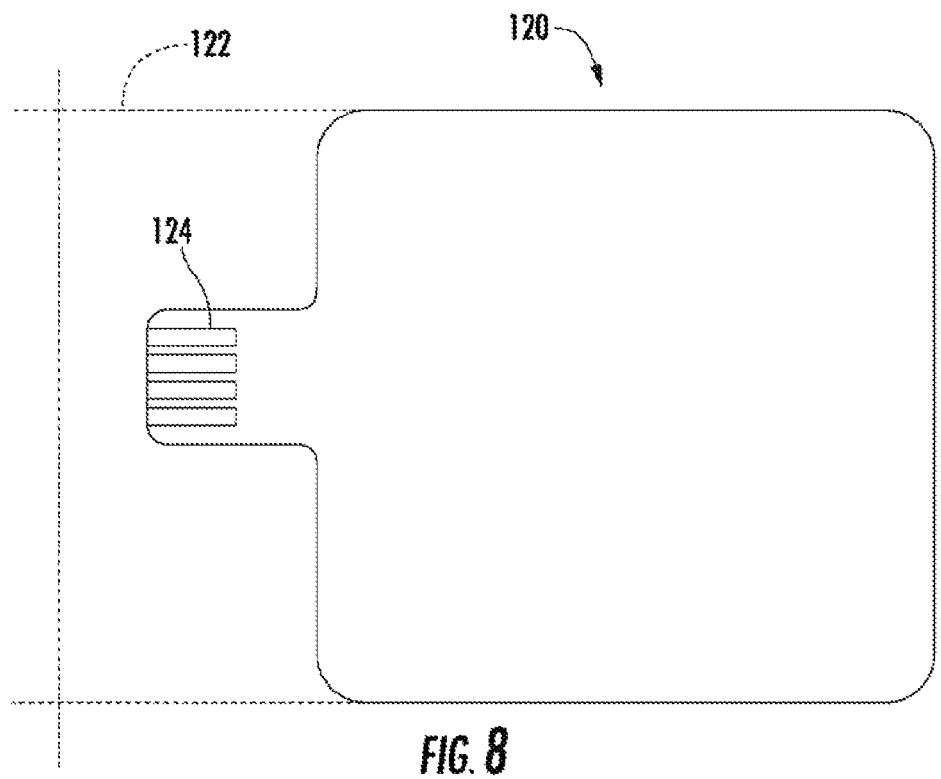
FIG. 8 illustrates an embodiment of a self-swiping card with a USB interface.

Referring to FIG. 8, the face of one embodiment of a self-swiping card 120 is depicted. The placement of the protrusion that exposes the USB connection, relative to the card boundary 122, is important. The USB connector 124 may be manufactured in a similar fashion to a typical ISO 7816 smart card module. The typical ISO 7816 module is then seated into the card medium during an assembly process. The exact placement of the module relative to the card boundary is defined in the ISO 7816 specification and many of the assembly machines used to place this module inside the card medium is set to place the module in a specific location as shown in the figure.

Figure 9:
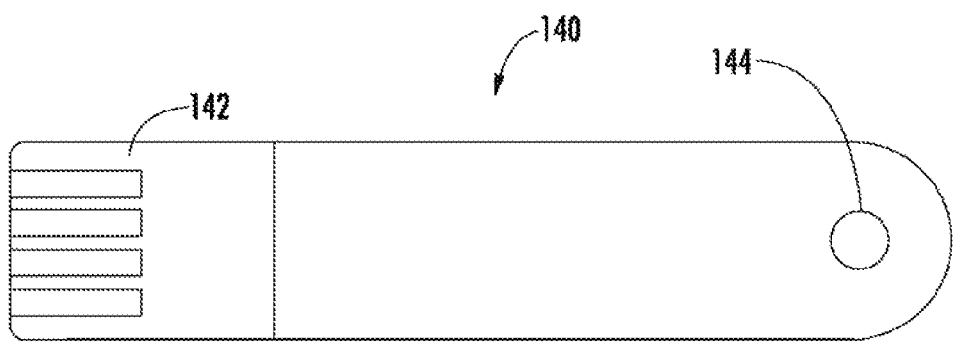
FIG. 9 illustrates a further embodiment of a self-swiping card with a USB interface.

Referring to FIG. 9, one embodiment of an alternate form-factor self-swiping card 140 is shown. This embodiment includes a USB connector 142 but has a form factor that lends itself to placing the card device on a key ring through a hole 144. The purpose of this figure is to illustrate some of the wide variations that can encompass various potential embodiments.

Figure 10:
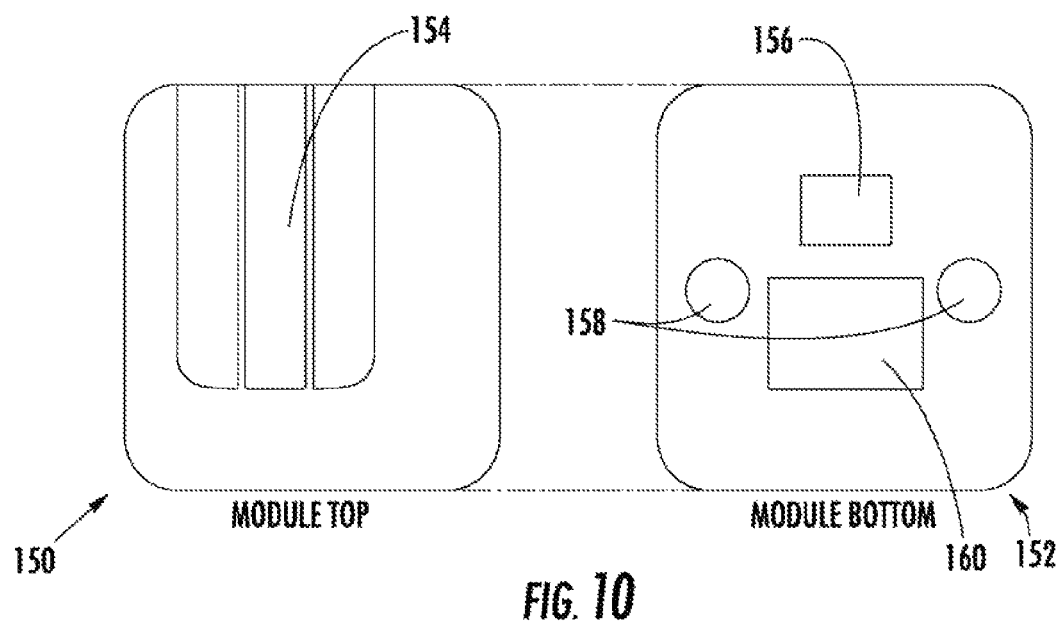
FIG. 10 illustrates an embodiment of the smart card module embedded in the card.

Referring to FIG. 10, components of a smartcard module 150 are depicted. On the left is the connector plate (module top) and on the right is the module bottom of the smartcard module 150. Looking at the right side of the figure, the bottom of the module exposes how the die from both the SE 160 and the interrogator 156 may be mounted. Also shown in the right portion of this figure, are the mounting pads 158 that may be connected to the inductive coil antenna for the contactless interface of the SE. The inductive coil antenna is typically assembled into the card medium prior to placement of the smart card module. The mounting pads are designed to make contact with the exposed ends of the inductive coil antenna. Looking at the left side of the figure, the connector plate is carved or scored in such a way that the connection pads 154 align themselves with the standard female USB connections of DC voltage, ground, D+, and D− that are defined in the USB specification at www.usb.org.

Figures 11A, 11B:
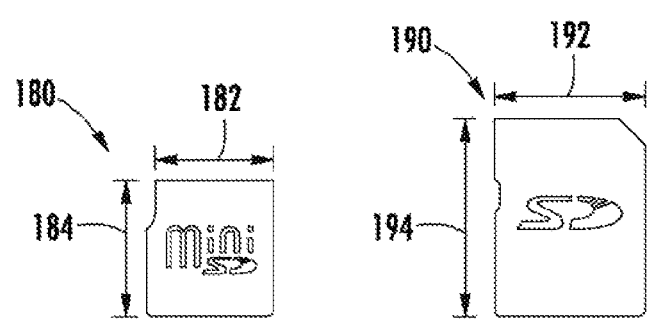
FIGS. 11A and 11B illustrates embodiments of a self-swiping card in a mini-SD and an SD form factor.

Two embodiments of a self-swiping card medium shown in FIGS. 11A and 11B. FIG. 11A depicts a standard "miniSD" 180 that is a common form factors for expansion memory or IO functionality. The miniSD 180 has a width 184 that is approximately 20 mm and a height 184 that is approximately 21.5 mm. FIG. 11B depicts a standard secured device ("SD") 190. The standard SD has a width 192 that is approximately 24 mm and a height 194 that is approximately 32 mm. These form factors 180 and 182 are fairly ubiquitous in mobile phones and personal digital assistants (PDAs) and therefore are convenient for use in various embodiments of a cellular network adapter. The SE and other electronics to interrogate the SE may be contained within these form factors. Additional features may be added such as additional expansion memory for the mobile device or PDA to access. Further detailed specifications for the SD 190 and the miniSD 180 form factor may be obtained at www.sdcard.org.

Figure 12:
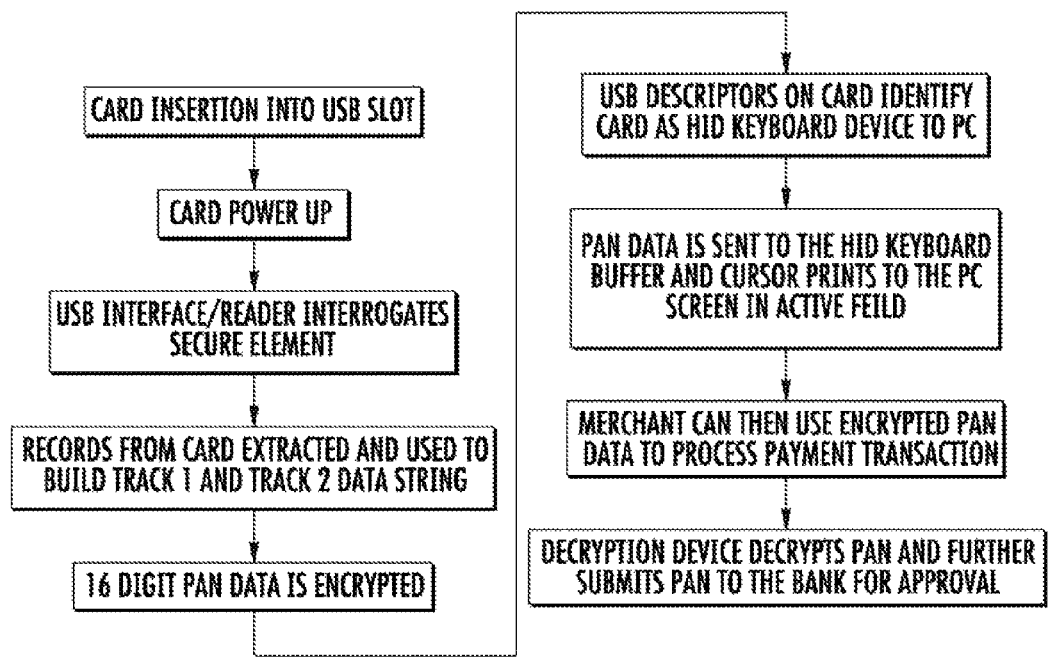
FIG. 12 illustrates a system where track 1 and track 2 data with an encrypted PAN (Personal Account Number) data are delivered via the world-wide web.

FIG. 12 illustrates a flow diagram that describes one method and use embodiment. After the card device is plugged into the USB connector on the customer computing device, the card device powers up and begins to interrogate the SE on the card device. The interaction and data exchange between the interrogator chip and the on the SE could look something like the diagram in FIG. 5.1. After the interrogator has received the all the data from the interrogation of the banking application on the SE, the interrogator can then build the data string that is to be sent to the computing device as keystrokes. It is important to know that the SE can run multiple applications from different application providers. In some embodiments the interrogator delivers the information that was acquired during interrogation of the banking application on the SE to a second application that resides on the same SE so that the second application can process, build, and possibly encrypt the data that will be delivered to the computing device as keystrokes.

An example of an embodiment that contains the interrogation of two applications on the SE typically looks something like the diagram in FIG. 5.2. The dotted lines in the figure represent the times during the entire interrogation of the SE that the interrogator selects different applications to use. The interrogator or the interrogator application on the SE may or may not encrypt the final Track 1 and/or Track 2 data. Specifically, in the embodiment reflected in FIG. 12 the PAN or Personal Account Number is encrypted within the final Track 1 and/or Track 2 data, or possibly by itself only. The encryption is handled in such a way as to not disturb the bank routing code within the PAN. This is typically the first 6 digits of the PAN. The final digit of the PAN is also adjusted as to equal the proper check digit for the new PAN. Once the new PAN is created from encrypting the original PAN, it is substituted in the place of the original PAN. Using this method, the merchant is able to receive the PAN and verify that it is a valid credit card number by checking the digits and calculating the proper check digit. After the PAN is submitted to the merchant for processing via HID keyboard buffer which prints the PAN and possibly other data into a "web form," the information is submitted by the user for processing. The merchant would be able to authorize the transaction as it would any other credit card transaction over the internet. When the encrypted PAN is submitted to the processor for authorization, the processor is able to send the encrypted PAN to a decryption device that will properly decrypt the PAN and build the original PAN to check for authorization. The advantage of using a method like this is that valid Personal Account Numbers are never transmitted from the user's computer over the internet.

To add further protection to the encrypted PAN, there is a transaction counter that can be factored into the encryption algorithm. This allows for a unique card number for each transaction that is processed. The encryption algorithm, encryption key, and transaction counter may be contained within the SE of the card. The encryption of the PAN may take place with every transaction and to take place within the SE. This type of encryption of the PAN may used with several embodiments of the present invention including mobile phones containing a SE. In the case of the mobile phone, the interrogation of the secure element is very similar to the interrogation depicted in FIG. 5.2. The mobile phone may not deliver the final data to a "web form", however, by auto populating a field, but instead it may receive the encrypted PAN and other data within its own memory structure and then pass the data to the merchant for processing either via internet or its own phone connection. In any case, this method of PAN encryption helps to protect the original PAN data that is needed to authorize a transaction. Because the PAN data is encrypted on the card itself, it may be considered safe to transmit over a network in clear text to the decryption device.

Figure 13:
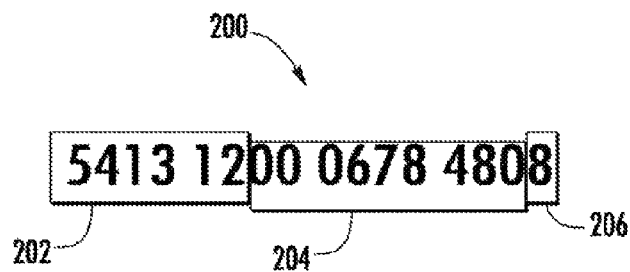
FIG. 13 illustrates a method of encrypting PAN digits that maintains the original bank routing code.

FIG. 13 presents a representation of a Personal Account Number or PAN 200 that is found on the face of a credit card and within the Track 1 and Track 2 data that is stored on the magnetic stripe or SE of a credit card. The first set of digits 202, usually ranging from the first 3 to the first 6 digits, is referred to as the Bank Code. This code is designated as a routing number for the many card association networks that describes which bank or "issuer" the PAN belongs to. The second set of digits 204 shown in FIG. 13 indicates the personal account number of the card holder at the issuer. The last digit 206 of the PAN is usually considered a "check byte" that is used to calculate if the complete PAN is indeed a valid PAN number. The algorithm normally used for the "check byte" is called the Luhn algorithm. The algorithm uses the digits in the PAN itself to make the proper calculation of the check byte. For this reason, if any digit in the PAN is changed, it is likely that the check byte will also need to be adjusted in order to make the new PAN considered valid. When encrypting the PAN, it is important not to change the bank code. The bank code may remain the original bank code in order for the encrypted PAN data to be routed to the appropriate bank and then to the decryption device that will replace the encrypted PAN digits with the original PAN digits.

In FIG. 13.1, and FIG. 13.2, one embodiment of an encryption algorithm is shown. This embodiment used DES in OFB mode as described in FIPS 81 as defined by NIST. A known initialization vector is XOR with a transaction counter that is maintained by the reader-on-card. Every transaction that is committed to, the counter increases. This will effectively change the initialization vector for encrypting the PAN digits. In a separate embodiment, it is also possible to incorporate a timestamp into the randomization processes of the initialization vector. This may not be possible in embodiments that do not have access to an accurate clock. After the initialization vector is XORed with the transaction counter, or other information, DES encryption is performed on the 64 bit, value using the DES key that is has been previously loaded into the interrogator application that is stored on the SE. This produces a 64 bit output value.

FIG. 13.2 shows the 64 bit output value from FIG. 13.1. The original account number from the PAN is also shown. The digits that will be changed within this account number are typically the middle 5 digits '6784'. The leading three digits '0' are generally reserved as placeholders for passing the transaction counter to the decryption device. The final two digits '80' are generally used to mark a DES key ID for the decryption device. The DES key ID may or may not be included is some embodiments. The purpose is to allow many different DES keys to be used by many different interrogators. Further on this subject, it is possible to create greater randomization of DES key by including a diversification process of the DES key in the interrogator application. A diversification process takes a master key and applies an algorithm to the key based on known data to produce a further randomized key to be used in the actual transaction. The two-digit key ID may actually be used to diversify a master DES key instead of identify a separate key.

The middle 4 digits to be encrypted may be represented in 14 bits. The 14 bits to be encrypted of the original account number are also shown at the bottom of FIG. 13.2. According to FIPS 81, using DES in OFB mode, the number of bits to encrypt can range from one to sixty-four during each iteration of the algorithm.

In this particular embodiment one iteration is shown, resulting in fourteen bits of encrypted cipher text. In order achieve the final cipher text; the first fourteen bits of the DES encrypted output text are XORed with the fourteen account bits that are to be encrypted. The resultant output is the fourteen bit cipher text to be placed back into the PAN, creating an encrypted PAN. FIG. 13.3 shows the conversion of the fourteen bit output from FIG. 13.2 into a four digit decimal. The four digit number is then placed into the issuer account number along with the transaction counter as shown in FIG. 13.3.

FIG. 13.4 shows the total encrypted PAN 250 with the bank code 252, the account number 254 and the updated check digit 256 that reflects the new PAN digits. Now, it is possible for this number to be processed in the exact same manner as a legitimate card PAN. The decryption device must be used to replace the encrypted PAN with the original PAN, but it is important to note that all the information for how to do so, including the transaction counter and DES key ID are included in the encrypted PAN.

The number of digits used for the DES key ID, transaction counter, and encrypted digits may vary depending on implementation of this method and the particular embodiment. It is also possible to share a single digit to represent parts of two different data elements. One example of this would be to divide a digit by 2 and discard the remainder to represent 0-4 for one data element (transaction counter, DES key ID, or encrypted digits), and then to divide the same digit by 2 and only use the remainder to represent 0-1 for separate data element (transaction counter, DES key ID, or encrypted digits).

Referring to FIG. 15, the internet browser form that receives the information from the card device as shown. This form is shown after the field 300 has been self-populated. The content in the form that is shown is an example of an encrypted PAN which is digits in this case and has a bank routing code of '541312'. The transaction counter is populated backwards over the next 3 digits '101'. The third digit, in this example, is used to share with the encrypted digits data element as described in the previous paragraph. So, the transaction counter is actually showing '001' when reversed. Including the shared digit, the next 5 digits represent the encrypted digits of the account number'14194'. The following two digits, '80', represent the DES key ID. And the final digit of '1' represents the check byte.

Looking at FIG. 15.1, the same "web form" as shown in FIG. 15 is shown with a field 302 auto populated with a second transaction from the same card device. When comparing the encrypted PAN's from FIG. 15 and FIG. 15.1, the differences are seen here:

$1^{st}$ Transaction—FIG. 15: 5413 1210 1419 4801 (encrypted PAN)

$2^{nd}$ Transaction—FIG. 15.1: 5413 1220 1176 280 (encrypted PAN)

When these transactions are received by the decryption device the original PAN may be decrypted and created. In this particular example shown in these figures, the original or valid PAN is:

Original PAN: 5413 1200 0763 2801 (valid PAN)

Figure 14:
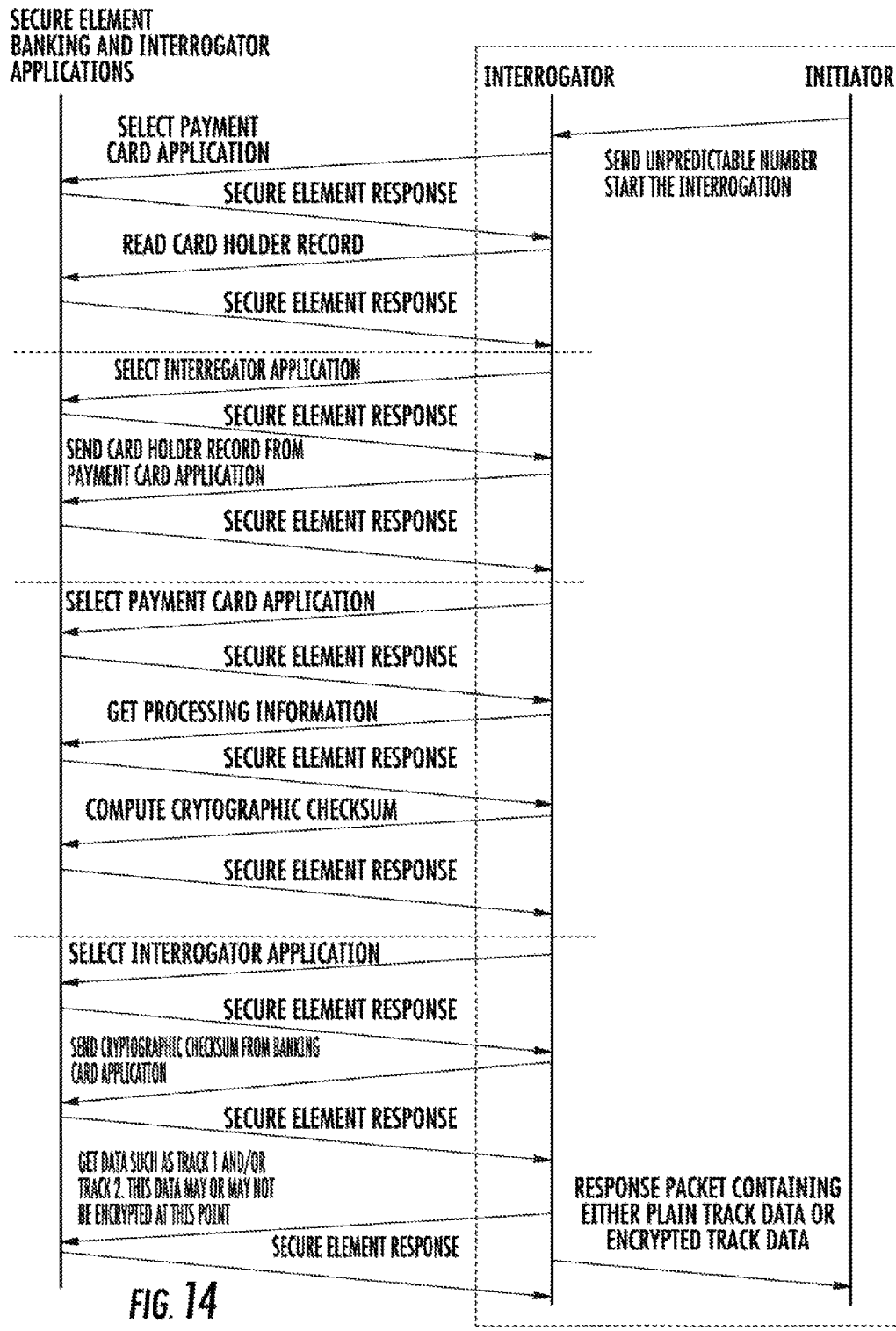
FIG. 14 illustrates a system where a reader on card is queried as an alternative to keyboard input.

FIG. 14 illustrates a flow diagram that describes one method embodiment. This particular embodiment is generally not appropriate for use with the HID keyboard emulation class of a USB device. This embodiment shows a 2-way form of communication from the base band device or host PC to the card device. The HID keyboard emulation class of a USB device is typically a 1-way device upon which the HID keyboard USB device communicates to the host PC via an "in" endpoint only. This allows data to move from the keyboard emulation device to the PC only. In such a case the interrogation most likely starts at the time the USB device is plugged into the computer and cannot be initialized by the PC.

The 2-way device as shown in FIG. 14, offers some added features to the system. In a case like this, the interrogation of the SE may be controlled by the base band device or by the host PC. Data such as an unpredictable number (UN), a timestamp, or some other type of deterministic data may be used during the interrogation of the SE, or may be sent to the card device to initiate an interrogation. An unpredictable number refers a number that may be used in algorithms of certain financial transaction authorization systems, such as VISA® or MASTERCARD®, in the encryption phase of a dynamic card verification code (DCVC). A DCVC is a 3 digit encrypted number that changes for each transaction (the dynamic aspect of the track data). The algorithm to create a DCVC typically uses a UN, a transaction counter, and DES key to derive a DCVC for each transaction. In some embodiments the financial transaction authorization system instructs a reader to create an unpredictable number. In some embodiments the communications controller may be configured to create a random UN and send it to the secure element during a transaction. The UN may be constructed as a hash of a timestamp, for example, and such a UN would ensure the authorization system that the SE made and returned its encrypted DCVC and that it was constructed at a certain (recent) time. This also adds another layer of security by establishing a basis for a precise expiration time for a particular transaction.

After the interrogation is complete, the resultant data string may be sent back to the base band device or host PC. There are many ways this system can be implemented. One example of an implementation would be using a generic HID class that allows both an "in" endpoint and an "out" endpoint to the USB card device. Both the "in" and "out" endpoints of a USB device are described by documentation that may be obtained at the www.usb.org website. The HID class driver is packaged and available on most host PC's. In order to use this HID class driver on a host PC, a client application must be resident and running on the host PC that identifies the proper HID device when it is connected to the host PC. The client application that is using the HID class driver may then issue command packets to the USB card device using the HID class interface and receive response packets from the USB card device using the HID class interface. Although using the HID class interface is not quite as ubiquitous to the system as using the HID keyboard class interface, it is still more ubiquitous then communicating to the USB device using a custom driver implantation. The HID class interface is possible to implement in PC side applications without creating a hardware driver 5 that runs on the host PC. The HID class interface can be created and used as a plug-in to internet web browsers and other PC applications. The HID class interface can also be built into simple executable programs that are allowed to communicate directly to a USB card.

In a similar embodiment it is possible to create a dual-purpose USB device that has both a HID class driver that allows an "out" endpoint to communicate to the USB card device from the host PC, and also uses the HID keyboard class interface with an "in" endpoint to send data back to the host PC via keyboard emulation. Another implementation of this system could be entirely contained inside a mobile phone. A 2-way data channel is used to initiate an interrogation with a secure element as well as receive the resultant data string after the interrogation is completed. It is important to note that there is a dashed line that encompasses a rectangle on FIG. 14 that contains both the "initiator" and the "interrogator" entities. These two entities may be handled and running within the same base band processor in the mobile phone. In this case they may exchange information within libraries or memory space only. The mobile phone may receive the resultant data via a keyboard buffer that can then auto-populate a form field, for example, in a mobile web browser. In any case, the 2-way data channel can be used to give more control as well as possibly more security to the system. By passing the unpredictable number, that is used in the dynamic Card Validation Code (CVC) generation within the SE, timestamp, or some other type of deterministic information, the baseband portion of the mobile phone or the host PC may validate and timestamp any transaction that it requests by linking a timestamp to a particular unpredictable number.

Also, the 2-way data channel represented in FIG. 14 allows for the entire transaction to be triggered by the base band device or host PC. The act of sending data to the card device can signal a start to the interrogation process.

Referring to FIG. 16, a diagram of a mobile phone with contactless or NFC functionality is displayed. One purpose of a mobile phone or like device with NFC technology is to enable the mobile phone itself to act as a payment card in order to make payments at a contactless terminal that may be located at a retailer location. In this embodiment the SE is embedded in a Secure IC within the phone. The SE on the phone may contain multiple bank accounts and may be controlled by the user interface of the phone. The diagram depicts the phone itself (baseband portion), the cellular network adapter 320 that includes a reader, the SE, and a processor in one of potentially multiple form factors (here either within the SIM or a Secure IC), the NFC bridge chip that is used to convert an electronic data signal to an RF data signal for an external reader, and the external reader that may also be used to interact with the SE in order to retrieve banking information. The reader in the cellular network adapter 320 may communicate to the using a number of different methods. For example, the reader in the cellular network adapter may communicate directly to the SE using ISO 7816-3 and 7816-4 protocols. An external reader may also communicate to the SE through an NFC bridge controller. The NFC controller controls the data paths to the RF interface as well as the data path to the SE. It is important to note that the interrogation of the SE can be initiated and carried out by either the reader in the cellular network adapter 320 or an external reader as shown in the diagram in FIG. 16.

FIG. 16.1 shows the same hardware device depicted in FIG. 16 being used for a different application. The application in FIG. 16.1 relates to using the same banking information stored on the SE for making a mobile payment transaction over the wireless network. A transaction like this is usually performed using a mobile phone connecting to a remote merchant over a wireless network (such as a cellular network) that may also be using the public internet and a mobile web browser on the phone itself. In order to deliver the transaction data from the SE to the web browser by the interrogator, keyboard emulation or software plug-in may be used to populate the web browser with the appropriate data. In the case where the transaction is not performed using a mobile web browser, the transaction information may pass to the merchant using other methods such as email, SMS, or other proprietary or standardized communication methods. The cellular network adapter 430 (the interrogator and the communications controller and the secure element), in this case, may be contained as an element 420 inside the mobile phone and exist as a software module running on the baseband of the phone. The interrogator essentially serves the same purpose as the contactless reader shown in FIG. 16. Its job is to interrogate the SE inside the phone and build a communication data package 400 that typically includes an encrypted pan and optionally Track 1 and/or Track 2 data. In order to do this, a "Reader On Card" mechanism may be used in order to further encrypt the PAN or full Track 1 and Track 2 data for transportation over a public network using the antenna 410 of a mobile phone.

After the interrogator has completed an interrogation process that is typically similar to the interrogation routine in FIG. 14 or FIG. 5.2, the data packet to be issued for authorization is sent to the "online merchant" over a wireless network. This data packet may contain full Track 1 and/or Track 2 information that has been encrypted or may contain only an encrypted PAN with an expiration date. The encrypted PAN is encrypted using the same method as described in FIG. 13, FIG. 13.1, FIG. 13.2, FIG. 13.3, and FIG. 13.4. After the encrypted data is passed to the "online merchant" the merchant may further submit the data just as it would a traditional card transaction to the processing network for authorization. The processing network then routes the data to the appropriate bank for authorization as shown in FIG. 16.1. Prior to the authorization of the data packet a "Decryption Device" interprets the data packet, decrypts the PAN or full track data, and replaces it with the original and legitimate PAN or track data. The decryption device may also perform other statistical checks on the PAN or track data such as verifying the transaction counter or timestamp is not repeated.

FIG. 16.2 shows a similar encryption technique for encrypting the card PAN. In this case, it is possible to add a timestamp factor into the encryption of the PAN. Because a mobile phone is an electronic device that can keep accurate time, the interrogator would be able to use a timestamp to further randomize the initialization vector that is used to encrypt the PAN data. When this transaction data reaches the decryption device on the other side of the network, the decryption device can then use a timestamp in a similar manner to decrypt the PAN data. It may not be possible to use a timestamp in all embodiments if the interrogator does not have access to an accurate clock.

As previously indicated, various embodiments may include embedding the SE within a mobile phone or PDA. Such embodiments may use portions of the baseband processor of the mobile phone or PDA as a communications controller and an interrogator. The combination of the SE, the communications controller and the interrogator then provide the principal components of a typical cellular network adapter. Software within the mobile phone may run the interrogation routines while interacting with the SE. The software may then perform communication controller functions by inserting the data extracted from the SE into appropriate areas such as SMS or email message, or form field. The insertion into these areas may include the keyboard emulation tactics previously described herein. The insertion into these areas may include automatic SMS or email message building and sending by software running on the mobile phone. The automatically built SMS or email message typically includes the extracted data from the interrogator.

In summary, embodiments disclosed herein describe various systems and methods for providing self-authorizing tokens and self-authorizing cellular network adapters. The foregoing descriptions of embodiments have been presented for purposes of illustration and exposition. They are not intended to be exhaustive or to limit the embodiments to the precise forms disclosed. Obvious modifications or variations are possible in light of the above teachings. The embodiments are chosen and described in an effort to provide the best illustrations of principles and practical applications, and to thereby enable one of ordinary skill in the art to utilize the various embodiments as described and with various modifications as are suited to the particular use contemplated. All such modifications and variations are within the scope of the appended claims when interpreted in accordance with the breadth to which they are fairly, legally, and equitably entitled.

What is claimed is:

1. A token comprising:
a mounting structure having a communication connector configured to connect to a computer terminal;
a secure element affixed to the mounting structure, the secure element comprising a data file,
a secure element reader affixed to the mounting structure and configured to interrogate the secure element by executing file system functions comprising a command to select a payment card application according to ISO 7816-4 and to generate file information from the secure element data file; and
a communications controller affixed to the mounting structure and configured to receive the file information from the secure element reader and to convert at least a portion of the file information into transaction information and to transmit the transaction information to the computer terminal through the communications connector, wherein the communication connector is a Universal Serial Bus (USB) connector and the communications controller is configured as a Human Interface Device (HID) class USB-device and the communications controller is configured to provide the transaction information in a format that auto-populates a form field defined by an application running on the computer terminal.

2. The token of claim 1 wherein the communications controller is configured to provide the transaction information in a prescribed cadence for an application running on the computer terminal.

3. The token of claim 1 wherein the secure element data file comprises financial authorization data and the communications controller is configured to extract at least a portion of the financial authorization data and is configured to encrypt the at least a portion of the financial data and to transmit the encrypted financial authorization data for transmission as transaction information to the computer terminal through the communications connector.

4. The token of claim 1 wherein:
the secure element data file comprises financial authorization data and the controller is configured to extract at least a portion of the financial authorization data and is configured to encrypt the at least a portion of the financial data and to transmit the encrypted financial authorization data for transmission as transaction information to the computer terminal using the USB connector.

5. The token of claim 4 wherein:
the communications controller is configured to provide the transaction information in a prescribed cadence for the application running on the computer terminal.

6. The token of claim 1 wherein the transaction information comprises an encrypted unpredictable number constructed as a hash of a timestamp.

7. The token of claim 1 wherein the transaction information comprises an encryption constructed from a timestamp and a transaction counter.

8. The token of claim 1 wherein the secure element reader is configured to await a startup instruction comprising an unpredictable number originating from the computer terminal prior to interrogating the secure element.

9. A token comprising:
a mounting structure having a communication connector configured to connect to a computer terminal;
a secure element affixed to the mounting structure, the secure element comprising a data file,
a secure element reader affixed to the mounting structure and configured to interrogate the secure element by executing file system functions comprising a command to select a payment card application according to ISO 7816-4 and to generate file information from the secure element data file; and
a communications controller affixed to the mounting structure and configured to receive the file information from the secure element reader and to convert at least a portion of the file information into transaction information and to transmit the transaction information to the computer terminal through the communications connector; wherein
the secure element data file comprises financial authorization data and the communications controller is configured to extract at least a portion of the financial authorization data and is configured to encrypt the at least a portion of the financial data and to transmit the encrypted financial authorization data for transmission as transaction information to the computer terminal through the communications connector, and wherein
the communications controller is configured to provide the transaction information in a format that auto-populates a form field defined by an application running on the computer terminal.

10. The token of claim 9 wherein the communications controller is configured to provide the transaction information in a prescribed cadence for an application running on the computer terminal.

11. A token comprising:
a mounting structure having a Universal Serial Bus (USB) connector configured to connect to a computer terminal;
a secure element affixed to the mounting structure, the secure element comprising a data file,
a communications controller affixed to the mounting structure and configured as a Human Interface Device (HID) class USB-device and configured to extract information from the secure element data file and to convert at least a portion of the data file into transaction information and to transmit the transaction information to the computer terminal through the USB connector as keyboard emulation and wherein the communications controller is configured to provide the transaction information in a format that auto-populates a form field defined by an application running on the computer terminal.

12. The token of claim 11 wherein the communications controller is configured to provide the transaction information in a prescribed cadence for an application running on the computer terminal.

13. The token of claim 11 wherein the secure element data file comprises financial authorization data and the communications controller is configured to extract at least a portion of the financial authorization data and is configured to encrypt the at least a portion of the financial data and to transmit the encrypted financial authorization data for transmission as transaction information to the computer terminal through the USB connector.

14. The token of claim 11 wherein the transaction information comprises an encrypted unpredictable number constructed as a hash of a timestamp.

15. The token of claim 11 wherein the transaction information comprises an encryption constructed from a timestamp and a transaction counter.

16. The token of claim 11 wherein the secure element reader is configured to await a startup instruction comprising an unpredictable number originating from the computer terminal prior to interrogating the secure element.

17. A token comprising:
a mounting structure having a Universal Serial Bus (USB) connector configured to connect to a computer terminal;
a secure element affixed to the mounting structure, the secure element comprising a data file; and
a communications controller affixed to the mounting structure and configured as a Human Interface Device (HID) class USB-device and configured to extract information from the secure element data file and to convert at least a portion of the data file into transaction information and to transmit the transaction information to the computer terminal through the USB connector as keyboard emulation; wherein
the secure element data file comprises financial authorization data and the communications controller is configured to extract at least a portion of the financial authorization data and is configured to encrypt the at least a portion of the financial data and to transmit the encrypted financial authorization data for transmission as transaction information to the computer terminal through the USB connector; and wherein
the communications controller is configured to provide the transaction information in a format that auto-populates a form field defined by an application running on the computer terminal.

18. The token of claim 17 wherein the communications controller is configured to provide the transaction information in a prescribed cadence for an application running on the computer terminal.

19. A token comprising:
a mounting structure having a communication connector configured to connect to a computer terminal;
a secure element affixed to the mounting structure, the secure element comprising a data file comprising financial authorization data,
a communications controller affixed to the mounting structure and configured to extract at least a portion of the financial authorization data from the secure element data file and configured to encrypt the at least a portion of the financial data and to transmit the encrypted financial authorization data as transaction information comprising an encrypted unpredictable number constructed as a hash of a timestamp to the computer terminal using the communication connector, wherein the communications controller is configured to provide the transaction information in a format that auto-populates a form field defined by an application running on the computer terminal.

20. The token of claim 19 wherein the communications controller is configured to provide the transaction information in a prescribed cadence for an application running on the computer terminal.

21. The token of claim 19 wherein the transaction information comprises an encryption constructed from the hash of the timestamp and a transaction counter.

22. The token of claim 19 wherein the secure element reader is configured to await a startup instruction comprising an unpredictable number originating from the computer terminal prior to interrogating the secure element.

23. A cellular network adapter for a cellular network device configured with a cellular network application interface comprising;
   a secure element comprising a data file;
   a secure element reader in the cellular network adapter configured to interrogate the secure element by executing file system functions according to ISO 7816-4 and to generate file information from the secure element data file;
   a near field communications controller bridge chip to convert the file information to an RF data signal for an external reader; and
   a communications controller configured to receive the file information from the secure element reader and to convert at least a portion of the file information into transaction authorization information and to transmit the transaction authorization information from the cellular network device over a wireless network through the cellular network application interface, wherein the wireless network comprises a cellular network and the secure element reader in the cellular network adapter is configured to await a startup instruction comprising an unpredictable number originating over the cellular wireless network prior to interrogating the secure element.

24. The cellular network adapter of claim 23 wherein the transaction authorization information comprises an encrypted unpredictable number constructed as a hash of a timestamp.

25. The cellular network adapter of claim 23 wherein the transaction authorization information comprises an encryption constructed from a timestamp and a transaction counter.

* * * * *